US009159243B2

(12) United States Patent
Tagato et al.

(10) Patent No.: US 9,159,243 B2
(45) Date of Patent: Oct. 13, 2015

(54) CONTROL ASSISTANCE DEVICE, CONTROL ASSISTANCE METHOD AND COMPUTER READABLE RECORD MEDIUM WITH PROGRAM RECORDED THEREON

(75) Inventors: Hiroki Tagato, Tokyo (JP); Takashi Nomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 314 days.

(21) Appl. No.: 13/990,673

(22) PCT Filed: Nov. 29, 2011

(86) PCT No.: PCT/JP2011/077471
§ 371 (c)(1), (2), (4) Date: Sep. 17, 2013

(87) PCT Pub. No.: WO2012/073927
PCT Pub. Date: Jun. 7, 2012

(65) Prior Publication Data
US 2014/0009313 A1 Jan. 9, 2014

(30) Foreign Application Priority Data
Nov. 30, 2010 (JP) ................................ 2010-266949
Jul. 13, 2011 (JP) ................................ 2011-155242

(51) Int. Cl.
*G06F 19/00* (2011.01)
*G08G 5/04* (2006.01)
*G08G 5/00* (2006.01)

(52) U.S. Cl.
CPC .............. *G08G 5/045* (2013.01); *G08G 5/0026* (2013.01); *G08G 5/0082* (2013.01)

(58) Field of Classification Search
CPC ...................................................... G08G 5/045
USPC ........ 340/961, 945, 963; 701/301; 342/29–32
See application file for complete search history.

(56) References Cited

U.S. PATENT DOCUMENTS 5,173,861 A 12/1992 Inselberg et al.
6,393,358 B1 * 5/2002 Erzberger et al. ............. 701/120
8,362,925 B2 * 1/2013 Brinkman et al. ............ 340/961
2002/0032528 A1 3/2002 Lai
2004/0143393 A1 * 7/2004 Knecht et al. ................. 701/301
2007/0200731 A1 * 8/2007 Winkler et al. ............... 340/961

FOREIGN PATENT DOCUMENTS

JP H05-274600 A 10/1993
JP 2000-276700 A 10/2000

(Continued)

OTHER PUBLICATIONS

The international search report for PCT/JP2011/077471 mailed on Feb. 21, 2012.

*Primary Examiner* — Brent Swarthout
(74) *Attorney, Agent, or Firm* — Sughrue Mion, PLLC

(57) ABSTRACT

An approach detector (20) detects the range in which a conflict will occur between an aircraft whose route is being searched and all other aircrafts on the basis of flight information acquired by a flight information acquirer (10). A first position detector (30) detects the position furthest from a position of entry in controlled airspace that the aircraft whose route is being searched can navigate to until the occurrence of the conflict. A second position detector (40), if the aircraft whose route is being searched maintains an altitude other than a set altitude, detects a position closest to a position of entry into controlled airspace that is beyond the position to which the altitude was changed from the set altitude, and that allows withdrawal from controlled airspace without the occurrence of the conflict. An altitude change detector (50) on the basis of the above described detection results detects an altitude change range that is a range in which the aircraft whose route is being searched can change altitude to avoid conflict.

15 Claims, 23 Drawing Sheets

(56) References Cited

FOREIGN PATENT DOCUMENTS

| | | | |
|---|---|---|---|
| JP | 2002-117500 | A | 4/2002 |
| JP | 2004-503843 | A | 2/2004 |
| JP | 2004-093538 | A | 3/2004 |
| JP | 2007-004252 | A | 1/2007 |
| JP | 2008-515707 | A | 5/2008 |
| JP | 2009-251729 | A | 10/2009 |

* cited by examiner

| AIRCRAFT NAME | ALTITUDE | FLIGHT ROUTE (TRANSIT POINTS AND TRANSIT TIMES) | | | | |
|---|---|---|---|---|---|---|
| AP1 | FL350 | FIX01, 2010/8/30 11:37 | FIX02, 2010/8/30 11:50 | FIX03, 2010/8/30 13:20 | FIX04, 2010/8/30 14:10 | |
| AP2 | FL340 | FIX01, 2010/8/30 11:40 | FIX05, 2010/8/30 12:30 | FIX06, 2010/8/30 13:20 | FIX07, 2010/8/30 14:20 | FIX08, 2010/8/30 14:50 |
| AP3 | FL350 | FIX04, 2010/8/30 14:20 | FIX03, 2010/8/30 15:20 | FIX02, 2010/8/30 16:50 | FIX01, 2010/8/30 17:15 | |
| : | : | : | : | : | : | : |

FIG.3

| TRANSIT POINT NAME | POSITION INFORMATION |
|---|---|
| FIX01 | −4683, 686 |
| FIX02 | −4428, 431 |
| FIX03 | −4376, 195 |
| FIX04 | −4929, −144 |
| FIX05 | −4970, −140 |
| FIX06 | −4965, −755 |
| FIX07 | −4795, −2180 |
| FIX08 | −4721, −2790 |
| FIX09 | −4396, −5835 |
| FIX10 | −4042, −8272 |
| FIX11 | −3258, −10299 |
| FIX12 | −5049, −424 |
| FIX13 | −5962, −918 |
| FIX14 | −6839, −1685 |
| FIX15 | −7614, −2365 |
| FIX16 | −8555, −3161 |
| FIX17 | −8984, −3517 |
| : | : |

FIG.4

| ALTITUDE | PARTIAL ROUTE1 (FIX01-02) | PARTIAL ROUTE2 (FIX02-03) | PARTIAL ROUTE3 (FIX03-04) | PARTIAL ROUTE4 (FIX04-05) | PARTIAL ROUTE5 (FIX05-06) | PARTIAL ROUTE6 (FIX06-07) | PARTIAL ROUTE7 (FIX07-08) | PARTIAL ROUTE8 (FIX08-09) | PARTIAL ROUTE9 (FIX09-10) | PARTIAL ROUTE10 (FIX10-11) |
|---|---|---|---|---|---|---|---|---|---|---|
| 40 | | | | | | | | | | |
| 39 | | | | | | | | 02:00-02:07 | | |
| 38 | | | | | | | | | | |
| 37 | | | 01:02-01:10 | 01:10-01:11 | 01:11-01:19 | 01:19-01:43 | 01:43-01:46 | 01:46-02:24 | 02:24-02:55 | 02:55-03:18 |
| 36 | | | | | | | | | | |
| 35 | | | | | | | | | | |
| 34 | 00:45-00:53 | 00:53-00:57 | 00:57-01:10 | 01:10-01:11 | 01:11-01:15 | | | | | |
| 33 | | | | | | | | | | |

FIG.5A

| SET ALTITUDE | FIRST POSITION |
|---|---|
| 39 | 02:00 |

FIG.5B

| ALTITUDE | SECOND POSITION |
|---|---|
| 40 | 00:45 |
| 38 | 00:45 |
| 37 | 03:18 |
| 36 | 00:45 |
| 35 | 00:45 |
| 34 | 01:15 |
| 33 | 00:45 |

FIG.6

| ALTITUDE | ALTITUDE CHANGE RANGE |
|---|---|
| 40 | 00:45-02:00 |
| 38 | 00:45-02:00 |
| 36 | 00:45-01:02 |
| 35 | 00:45-01:02 |

FIG.7

| AIRCRAFT NAME | ALTITUDE | FLIGHT PATH (TRANSIT POINTS AND TRANSIT TIMES) | | | | | | | | | | |
|---|---|---|---|---|---|---|---|---|---|---|---|---|
| APL001 | 39 | FIX01, 00:45 | FIX02, 00:53 | FIX03, 00:57 | FIX04, 01:10 | FIX05, 01:11 | FIX06, 01:19 | FIX07, 01:38 | FIX08, 01:46 | FIX09, 02:24 | FIX10, 02:55 | FIX11, 03:22 |
| APL002 | 39 | FIX11, 00:34 | FIX10, 01:05 | FIX09, 01:39 | FIX08, 02:22 | FIX07, 02:31 | FIX06, 02:51 | | | | | |
| APL003 | 37 | FIX01, 01:00 | FIX02, 01:04 | FIX03, 01:07 | FIX04, 01:10 | FIX05, 01:10 | FIX06, 01:18 | FIX07, 01:35 | FIX08, 01:42 | FIX09, 02:20 | FIX10, 02:50 | FIX11, 03:16 |
| APL004 | 34 | FIX01, 00:40 | FIX02, 00:47 | FIX03, 00:51 | FIX04, 01:04 | FIX12, 01:08 | FIX13, 01:24 | FIX14, 01:43 | FIX15, 02:00 | FIX16, 02:20 | FIX17, 02:28 | |
| : | : | : | : | : | : | : | : | : | : | : | : | : |

| AIRCRAFT NAME 1 | AIRCRAFT NAME 2 | COMMON ROUTES |
| --- | --- | --- |
| APL001 | APL003 | FIX01-02,FIX02-03,FIX03-04,・・・ |
| APL001 | APL004 | FIX01-02,FIX02-03,FIX03-04 |
| APL003 | APL004 | FIX01-02,FIX02-03,FIX03-04 |
| : | : | : |

CONTROL ASSISTANCE DEVICE, CONTROL ASSISTANCE METHOD AND COMPUTER READABLE RECORD MEDIUM WITH PROGRAM RECORDED THEREON

This application is a National Stage Entry of PCT/JP2011/077471 filed Nov. 29, 2011, which claims priority from Japanese Patent Application 2010-266949 filed on Nov. 30, 2010 and Japanese Patent Application 201 1-1 55242 filed on Jul. 13, 2011, the contents of all of which are incorporated herein by reference, in their entirety.

TECHNICAL FIELD

The present invention relates to a control assistance device, a control assistance method and a computer-readable recording medium on which a program is recorded.

BACKGROUND ART

Air traffic controllers (hereafter referred to as "controllers") engaging in airspace control (hereafter referred to as "control") have a primary obligation of providing accurate control guidance to aircraft so that multiple aircraft do not become abnormally close to each other (hereafter referred to as "conflict").

In recent years, air traffic volume has increased accompanying growth in demand for air transportation. Consequently, providing accurate control guidance so that conflicts do not occur has become an onerous burden for controllers.

In consideration of these circumstances, devices and systems have been developed that use information technology to generate control guidance to prevent conflicts from occurring, in order to ease the burden on controllers.

In Patent Literature 1, a flight path route setting device and recording medium are disclosed that detect route information for aircraft falling under prescribed collision conditions, when flight paths are changed, and change the detected route information of the aircraft so as to get out of the collision conditions. This airspace route setting device partitions airspace that is the target of control into multiple cells, and extracts cells in which there is operating information for two or more aircraft, based on operating information for aircraft maintained by the airspace route setting device. Furthermore, a process for detecting route information for aircraft falling under prescribed collision conditions is accomplished only in the extracted cells. When route information for aircraft falling under the prescribed collision conditions is extracted, the altitude of the aircraft is adjusted so that the time interval between when multiple aircraft pass through a prescribed point becomes at least a prescribed interval, so as to get out of the collision conditions.

Patent Literature 2 discloses a four-dimensional optimum route guidance system for aircraft that extracts four-dimensional optimum routes that do not cause conflicts, for multiple aircraft. This four-dimensional optimum route guidance system extracts the optimum routes that minimize the cost to all aircraft based on cost indicators such as distance, required time and required fuel. Specifically, nodes in which points through which aircraft pass within the controlled airspace are designated by three-dimensional (latitude, longitude, altitude) values are set. In addition, legs linking nodes are set. A cost is assigned to each leg, an estimated cost to a destination is assigned to each node and the cost-minimizing route from the current position to a destination is found using an A* algorithm. When the occurrence of a conflict is anticipated for a calculated route, the optimum route for the aircraft having higher priority rank is fixed, based on the priority ranking set for the aircraft. Furthermore, for the aircraft having lower priority ranking, the optimum route such that a conflict does not occur with the aircraft having higher priority ranking is recalculated.

Patent Literature 3 and Patent Literature 4 disclose art for preventing the occurrence of conflicts through detours in flight paths or altitude changes when the likelihood of a conflict occurring is detected through wireless navigation equipment and/or the like installed in aircraft.

PRIOR ART LITERATURE

Patent Literature

Patent Literature 1: Unexamined Japanese Patent Application Kokai Publication No. 2002-117500.

Patent Literature 2: Unexamined Japanese Patent Application Kokai Publication No. 2009-251729.

Patent Literature 3: Unexamined Japanese Patent Application Kokai Publication No. 2004-093538.

Patent Literature 4: Unexamined Japanese Patent Application Kokai Publication No. 2008-515707.

DISCLOSURE OF THE INVENTION

Problem to be Solved by the Invention

The flight path setting device disclosed in Patent Literature 1 adjusts the speed of the aircraft so that the time interval at which multiple aircraft pass through a prescribed point is at least a prescribed interval, when route information of aircraft falling under prescribed collision conditions is detected. However, this does not prevent the occurrence of conflicts by giving consideration to adjusting the altitude of the aircraft in flight.

The art disclosed in Patent Literature 3 and Patent Literature 4 prevents the occurrence of conflicts by detouring the flight path or changing altitude when anticipation of a conflict occurrence is detected. However, this does not prevent the occurrence of conflicts by giving consideration to the entirety of the controlled airspace.

The four-dimensional optimum route guidance system disclosed in Patent Literature 2 sets nodes that are points through which aircraft in the airspace pass and legs that are flight paths between nodes, and finds the optimum route. Furthermore, when the anticipated occurrence of a conflict with an aircraft having a high priority is detected, a graph search is again conducted and an evasion route calculated. Because altitude information is contained in the nodes that are points through which aircraft pass, prevention of the occurrence of conflicts is accomplished taking altitude into consideration. However, candidates that can be taken as evasion routes are only legs for which the occurrence of a conflict is not anticipated. That is to say, when the occurrence of a conflict is anticipated in a portion of a leg, that leg as a whole is excluded from being a candidate for an evasion route. On the other hand, if the number of nodes set in the airspace is increased and the legs shortened, the parts of legs that are excluded from being candidates for evasion routes despite no anticipation of the occurrence of a conflict becomes smaller. However, the A* algorithm used in this route search has a heavy calculation burden, and the calculation burden increases if the number of nodes is increased further.

In consideration of the foregoing, it is an object of the present invention to enable route changes during partial routes that are routes between predetermined transit points through which aircraft pass in controlled airspace in order to prevent the occurrence of conflicts, taking the entire controlled airspace into consideration.

Means for Solving the Problem

The control assistance device according to a first aspect of the present invention comprises:

a flight information acquirer for acquiring flight information containing information indicating flight plans and positions of flight routes of each craft that is a target of control, in a controlled airspace;

a conflict detector for detecting, for a set altitude that is an altitude set in the flight information of a flight search target craft that is a one of the craft that is the target of control and is a target of route searching and at least one navigable altitude within the controlled airspace other than the set altitude, ranges in which a conflict occurs between the route search target craft and each of the other control-target craft and generating conflict range information indicating the ranges in which the conflicts occur at each altitude, when the route search target craft has flown on the flight path set in the flight plan maintaining the respective altitudes, based on the flight information;

a first position detector for detecting a first position that is a position farthest from the entry position into the controlled airspace navigable until occurrence of the conflict and generating first position information indicating the first position, when the route search target craft has flown on the flight path maintaining the set altitude, based on the flight information and the conflict range information;

a second position detector for detecting a second position that is a position closest to the entry position where separation is possible from the controlled airspace without occurrence of the conflict after the position at which a change was made from the set altitude to the navigable altitude, and generating second position information indicating the second position for each of the navigable altitudes, when the route search target craft has flown the flight path while maintaining the respective altitudes for each of the navigable altitudes that are targets of the conflict detection other than the set altitude, based on the flight information and the conflict range information; and an altitude change range detector for generating altitude change range information that makes the second position the start position and the first position the end position when the second position at the navigable altitude is closer to the entry position than the first position, for each navigable altitude that is the target of second position detection, based on the conflict information, the first position information and the second position information, and generating altitude change range information for each navigable altitude when the conflict range exists in the altitude change range at altitudes between the set altitude and the navigable altitudes, excluding the conflict range from the altitude change range.

The control assistance method according to a second aspect of the present invention comprises:

a flight information acquisition step for acquiring flight information containing information indicating flight plans and positions of flight routes of each craft that is a target of control, in a controlled airspace;

a conflict detection step for detecting, for a set altitude that is an altitude set in the flight information of a flight search target craft that is a one of the craft that is the target of control and is a target of route searching and at least one navigable altitude within the controlled airspace other than the set altitude, ranges in which a conflict occurs between the route search target craft and each of the other control-target craft and generating conflict range information indicating the ranges in which the conflicts occur at each altitude, when the route search target craft has flown on the flight path set in the flight plan maintaining the respective altitudes, based on the flight information;

a first position detection step for detecting a first position that is a position farthest from the entry position into the controlled airspace navigable until occurrence of the conflict and generating first position information indicating the first position, when the route search target craft has flown on the flight path maintaining the set altitude, based on the flight information and the conflict range information;

a second position detection step for detecting a second position that is a position closest to the entry position where separation is possible from the controlled airspace without occurrence of the conflict after the position at which a change was made from the set altitude to the navigable altitude, and generating second position information indicating the second position for each of the navigable altitudes, when the route search target craft has flown the flight path while maintaining the respective altitudes for each of the navigable altitudes that are targets of the conflict detection other than the set altitude, based on the flight information and the conflict range information; and an altitude change range detection step for generating altitude change range information that makes the second position the start position and the first position the end position when the second position at the navigable altitude is closer to the entry position than the first position, for each navigable altitude that is the target of second position detection, based on the conflict information, the first position information and the second position information, and generating altitude change range information for each navigable altitude when the conflict range exists in the altitude change range at altitudes between the set altitude and the navigable altitudes, excluding the conflict range from the altitude change range.

The program recorded on a computer-readable recording medium according to a third aspect of the present invention causes a computer to execute:

a flight information acquisition step for acquiring flight information containing information indicating flight plans and positions of flight routes of each craft that is a target of control, in a controlled airspace;

a conflict detection step for detecting, for a set altitude that is an altitude set in the flight information of a flight search target craft that is a one of the craft that is the target of control and is a target of route searching and at least one navigable altitude within the controlled airspace other than the set altitude, ranges in which a conflict occurs between the route search target craft and each of the other control-target craft and generating conflict range information indicating the ranges in which the conflicts occur at each altitude, when the route search target craft has flown on the flight path set in the flight plan maintaining the respective altitudes, based on the flight information;

a first position detection step for detecting a first position that is a position farthest from the entry position into the controlled airspace navigable until occurrence of the conflict and generating first position information indicating the first position, when the route search target craft has flown on the flight path maintaining the set altitude, based on the flight information and the conflict range information;

a second position detection step for detecting a second position that is a position closest to the entry position where separation is possible from the controlled airspace without occurrence of the conflict after the position at which a change was made from the set altitude to the navigable altitude, and generating second position information indicating the second position for each of the navigable altitudes, when the route search target craft has flown the flight path while maintaining the respective altitudes for each of the navigable altitudes that are targets of the conflict detection other than the set altitude, based on the flight information and the conflict range information; and an altitude change range detection step for generating altitude change range information that makes the second position the start position and the first position the end position when the second position at the navigable altitude is closer to the entry position than the first position, for each navigable altitude that is the target of second position detection, based on the conflict information, the first position information and the second position information, and generating altitude change range information for each navigable altitude when the conflict range exists in the altitude change range at altitudes between the set altitude and the navigable altitudes, excluding the conflict range from the altitude change range.

Effects of the Invention

With the present invention, it is possible to change routes in the middle of partial routes that are flight paths routes between predetermined points through which aircraft pass in controlled airspace, in order to prevent the occurrence of conflicts, taking the entire controlled airspace into consideration.

BRIEF DESCRIPTION OF DRAWINGS

FIG. 3 is a drawing showing an example of transit point position information in the first preferred embodiment;

FIG. 4 is a drawing showing an example of conflict range information in the first preferred embodiment;

FIG. 5A is a drawing showing an example of first position information in the first preferred embodiment;

FIG. 5B is a drawing showing an example of second position information in the first preferred embodiment;

FIG. 6 is a drawing showing an example of altitude change range information in the first preferred embodiment;

FIG. 7 is a drawing showing another example of a flight plan in the first preferred embodiment;

MODE FOR CARRYING OUT THE INVENTION

Below, the preferred embodiments of the present invention are described in detail with reference to the drawings. In these drawings, parts that are the same or comparable are labeled with the same symbols. In the explanation below, conflict detection means detecting the likelihood of an abnormal approach between aircraft. Conflict range means a range in which abnormal approach between aircraft is probable.

(First preferred embodiment)

Figures 1, 2:
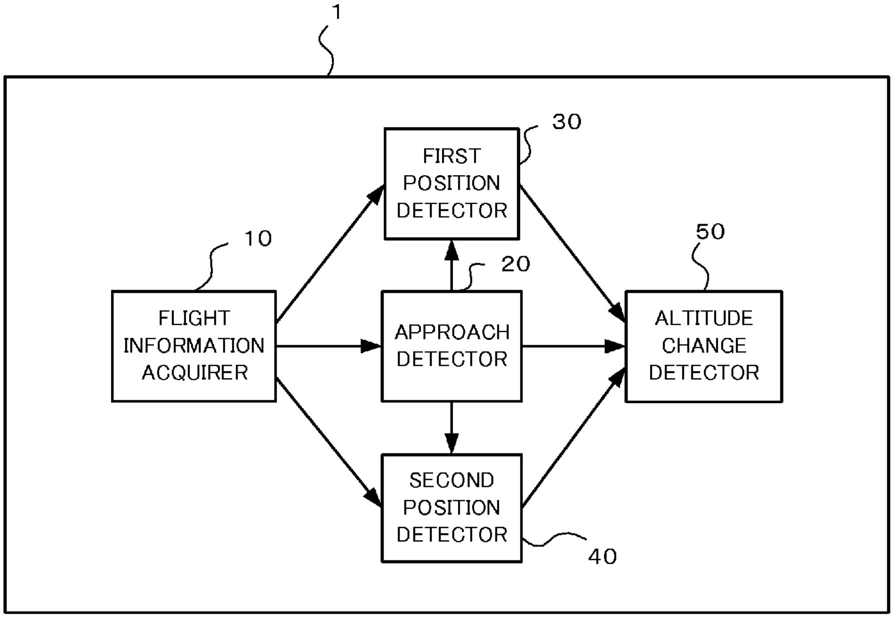
FIG. 1 is a block diagram showing an example of the composition of a control assistance device according to a first preferred embodiment of the present invention.
FIG. 2 is a drawing showing an example of a flight plan in the first preferred embodiment.

FIG. 1 is a block diagram showing an example of the composition of a control assistance device according to a first preferred embodiment of the present invention. A control assistance device 1 in FIG. 1 comprises a flight information acquirer 10, an approach detector 20, a first position detector 30, a second position detector 40 and an altitude change detector 50. In the explanation below, the aircraft subject to control that is the target of route searches is called the target craft, and it is assumed that there is one target craft. In addition, all other aircraft subject to control are called aircraft.

The control assistance device 1 accomplishes conflict detection between the target craft flying within the controlled airspace and all other aircraft, for each navigable altitude (hereafter called altitude) within the controlled airspace. The control assistance device 1 detects a range in which the altitude set in the flight information of the target craft (hereafter referred to as the set altitude) can undergo a route change to a different altitude in order to avoid a conflict range detected by the target craft. The various components of the control assistance device 1 are explained below.

The flight information acquirer 10 acquires flight information from a flight information memory housing flight information. The flight information memory is provided internally or externally to the control assistance device 1. The flight information acquirer 10 sends acquired flight information to the approach detector 20, the first position detector 30 and the second position detector 40.

FIG. 2 is a drawing showing an example of a flight plan in the first preferred embodiment. When aircraft are flying within the controlled airspace, it is typical to fly on partial routes that are line segments connecting two adjacent transit points, out of the transit points set within the controlled airspace. The flight information contains transit point position information indicating positions of transit points, and flight plans of various aircraft. Details of transit point position information are described below. As shown in FIG. 2, a flight path for flying at a set altitude is set for each aircraft in the flight plan. Flight paths are set for each altitude, and are expressed by transit point names for each transit point comprising the flight path, and transit times. The blank row in the drawing means there is no data. The same is also true in other drawings.

In the example of FIG. 2, an aircraft named AP1 is flying at an altitude of FL350, and transits transit point FIX01 at 2010 Aug. 30_11:37, transit point FIX02 at 2010 Aug. 30_11:50, transit point FIX03 at 2010 Aug. 30_13:20 and transit point FIX04 at 2010 Aug. 30_14:10. Based on the flight plan and the transit point position information, the position of the flight path in the controlled airspace (latitude, longitude, altitude) and the transit times of the various aircraft are specified.

In the example of FIG. 2, in the case of the aircraft named AP1, FIX01-02 (a line segment connecting transit points FIX01 and 02), FIX02-03 (a line segment connecting transit points FIX02 and 03), and FIX03-04 (a line segment connecting transit points FIX03 and 04) are respectively partial routes for the aircraft named AP1. In the case of the aircraft named AP3, FIX04-03 (a line segment connecting transit points FIX04 and 03), FIX03-02 (a line segment connecting transit points FIX03 and 02), and FIX02-01 (a line segment connecting transit points FIX02 and 01) are respectively partial routes for the aircraft named AP3.

In the example of FIG. 2, transit points are expressed by transit point names, such as FIX01. However, rather than transit point names, such may be composed using the values of the latitude and longitude indicating the position of the transit point or other information that can uniquely identify the transit point. FIG. 3 is a drawing showing an example of transit point position information in the first preferred embodiment. The transit point position information shows a corresponding relationship between transit point name and information that can identify the position of the transit point. As in the example of FIG. 2, when a transit point is expressed by transit point name, transit point position information such as that shown in FIG. 3 that shows the corresponding relationship between transit point names and information that can identify the position of transit points is stored inside the control assistance device 1. In addition, the transit point position information may be stored external to the control assistance device 1 and may be referenced from the control assistance device 1.

The approach detector 20 of FIG. 1 accomplishes conflict detection between the target craft and all other aircraft for partial routes at each altitude when the target craft is flying at various altitudes, based on the flight information received from the flight information acquirer 10. The approach detector 20 generates conflict range information indicating a conflict range when a conflict range is detected. The start position and end position of the conflict range are expressed by the times at which the target craft transits the start position and end position, respectively. The approach detector 20 accomplishes conflict detection for example as described below, and generates conflict range information.

The approach detector 20 selects one partial route of the target craft at one altitude and one partial path of one other aircraft flying at the set altitude. Furthermore, the approach detector 20 accomplishes conflict detection between the target craft and the one other aircraft based on the selected partial route of the target craft and partial route of the one other aircraft. When a conflict range is detected, the approach detector 20 generates conflict range information. When a conflict range is not detected, the approach detector 20 does not generate conflict range information.

The approach detector 20 repeats the above-described conflict detection for each partial route, at each altitude of the target craft. The approach detector 20 generates conflict range information by accomplishing conflict detection between the target craft and all other aircraft, for all partial routes at all altitudes of the target craft. The approach detector 20 sends the generated conflict range information to the first position detector 30, the second position detector 40 and the altitude change detector 50. FIG. 4 is a drawing showing an example of conflict range information in the first preferred embodiment. The conflict range information shows, at each altitude of the target craft, the start time and end time of the conflict range for each partial route. Besides time, the start position and end position of the conflict range may be expressed, for example as distance, latitude and longitude, and/or the like.

Conflict detection between the target craft and other aircraft is accomplished the same as with the related art. For example, whether or not the target craft passing through one partial route of the target craft and one other aircraft passing through one partial route of that aircraft approach to a distance within the collision safety interval is determined based on information such as the collision safety interval set around an aircraft, and the range of approaching to a distance within the collision safety interval is detected as the conflict range.

The first position detector 30 of FIG. 1 detects the farthest position from the position entering the controlled airspace to which the target craft can fly until the conflict range when the target craft flies maintaining the set altitude, based on the flight information received from the flight information acquirer 10 and the conflict range information received from the approach detector 20. The first position detector 30 generates first position information indicating the first position, with the detected position as the first position. The first position information is expressed by the time at which the target craft transits the first position. The position farthest form the entry position is determined based on the flight time or flight distance along the flight path the target craft is flying. The first position detector 30 accomplishes first position detection for example as discussed below and generates first position information.

The first position detector 30 initializes the first position t_hcur with an arbitrary value that is at least the time needed for the target craft to leave the controlled airspace. The first position detector 30 detects whether or not there is a conflict range for each partial route of the target craft, based on the set altitude of the target craft. When a conflict range is detected, the first position detector 30 determines whether or not the first position t_hcur is a time later than the start time of the conflict range, and when this is later, updates the first position t_hcur with the start time of the detected conflict range. When no conflict range is detected, or when the first position t_hcur is not a time later than the start time of the detected conflict range, the first position detector 30 does not update the first position t_hcur.

The first position detector 30 repeatedly does the above-described process for each partial route at the set altitude of the target craft, detects the first position t_hcur and generates the first position information The first position detector 30 sends the first position information to the altitude change detector 50. FIG. 5A is a drawing showing an example of the first position information in the first preferred embodiment. The first position information shows the first position t_hcur at the set altitude of the target craft. Besides time, the first position may for example be expressed by distance, latitude and longitude and/or the like.

For each altitude other than the set altitude of the target craft, when the target craft is maintaining that altitude while flying, the second position detector 40 detects the position closest to the entry position into the controlled airspace where the target craft can withdraw from the controlled airspace without the possibility of a conflict occurring after the position is changed to that altitude from the set altitude of the target craft, based on the flight information received from the flight information acquirer 10 and the conflict range information received from the approach detector 20. The second position detector 40 generates second position information indicating the second position for each altitude, with that detected position as the second position. The second position is expressed by the time at which the target craft transits the second position.

The position closest to the entry position is determined based on the flight distance or the flight time following the flight path on which the target craft is flying. The second position detector 40 for example accomplishes second position detection as described below, and generates the second position information.

The second position detector 40 initializes the second position t_h to 0. The second position detector 40 detects the absence or presence of a conflict range for each partial route of the target craft at one altitude other than the set altitude of the target craft. When a conflict range is detected, the second position detector 40 determines whether or not the second position t_h is an earlier time than the ending time of the detected conflict range, and when this is an earlier time, updates the second position t_h with the end time of the detected conflict range. When a conflict range is not detected, or when the second position t_h is not a time earlier than the end time of the detected conflict range, the second position detector 40 does not update the second position t_h.

The second position detector 40 repeats the above process for the partial routes at each altitude other than the set altitude of the target craft, detects the second position t_h at all altitudes other than the set altitude of the target craft and generates the second position information. When the above-described process has been concluded on all partial routes of the target craft at a given altitude other than the set altitude, when the second position t_h is still the initial value 0, the second position detector 40 updates the second position t_h with the earliest transit time of the target craft set in the flight information. The second position detector 40 sends the second position information including the second position t_h at altitudes other than the set altitude to the altitude change detector 50. FIG. 5B is a drawing showing an example of the second position information in the first preferred embodiment. The second position information shows the second position t_h at each altitude other than the set altitude of the target craft. Besides time, the second position may for example be expressed by distance, latitude and longitude and/or the like.

The first position detector 30 and the second position detector 40 may be comprised so that one of the processes is accomplished first and the other process is accomplished when that process concludes, or may be comprised so that both processes are accomplished in parallel.

For each altitude other than the set altitude of the target craft, the altitude change detector 50 of FIG. 1 determines whether or not the second position at that altitude is closer than the first position to the entry position into the controlled airspace based on the conflict range information received from the approach detector 20, the first position information received from the first position detector 30 and the second position information received from the second position detector 40. When the second position at that altitude is closer than the first position to the entry position into the controlled airspace, the altitude change detector 50 generates an altitude change range with the second position at that altitude as the start position and the first position as the end position. Furthermore, the altitude change detector 50 detects the absence or presence of conflict ranges for partial routes at each altitude between that altitude and the set altitude of the target craft. When there is a conflict range at an altitude between that altitude and the set altitude of the target craft, within the altitude change range, the craft cannot fly in that conflict range at the in-between altitude. Accordingly, the altitude change detector 50 updates the altitude change range, excluding the conflict range from the altitude change range. The start position and the end position of the altitude change range are expressed by the times at which the target craft respectively transits the start position and the end position. The altitude change detector 50 accomplishes altitude change range detection for example as described below, and generates altitude change range information.

At one altitude other than the set altitude of the target craft, the altitude change detector 50 initializes the start time of the altitude change range as the second position t_h at that altitude, and initializes the end time of the altitude change range as the first position t_hcur. At this time, when the start time is a time later than the end time, the altitude change detector 50 determines that there is no altitude change range. When the start time is earlier than the end time, the altitude change detector 50 detects the absence or presence of an altitude between that altitude and the set altitude of the target craft. When there is no in-between altitude, the initial values become the altitude change range at that altitude. When there is an in-between altitude, the altitude change detector 50 detects the absence or presence of a conflict range in the partial route of the target craft at that in-between altitude. When a conflict range is detected, the craft cannot fly in that conflict range at that in-between altitude, so the altitude change detector 50 excludes that conflict range from the altitude change range.

The altitude change detector 50 repeats the above-described process for the partial routes at each altitude between that altitude and the set altitude of the target craft, and accomplishes detection of the absence or presence of a conflict range and exclusion of the conflict range from the altitude change range in all partial routes of the target craft at all altitudes between that altitude and the set altitude of the target craft. When no conflict range is detected, the initial values become the altitude change range at that altitude.

The altitude change detector 50 repeats the above-described process for each altitude other than the set altitude of the target craft, detects the altitude change range at all altitudes other than the set altitude of the target craft, and generates altitude change range information containing the altitude change range for each altitude. FIG. 6 is a drawing showing an example of altitude change range information in the first preferred embodiment. The altitude change range information indicates the start time and the end time of the altitude change range for each altitude other than the set altitude of the target craft. The altitude change range information may also be displayed on a screen of the control assistance device 1, for example, or may be sent externally from the control assistance device 1. Besides times, the start position and the end position of the altitude change range may for example be expressed as distances, latitudes and longitudes and/or the like.

FIG. 7 is a drawing showing another example of a flight plan in the first preferred embodiment. Date and time are abbreviated herein. Examples of the processes accomplished by each component of the control assistance device 1 explained with reference to FIG. 1 are explained below with reference to FIG. 7. In the explanation below, the aircraft named APL001 is taken to be the target craft, and the navigable altitudes in the controlled airspace are assumed to be 33, 34, 35, 36, 37, 38, 39 and 40.

Figure 8:
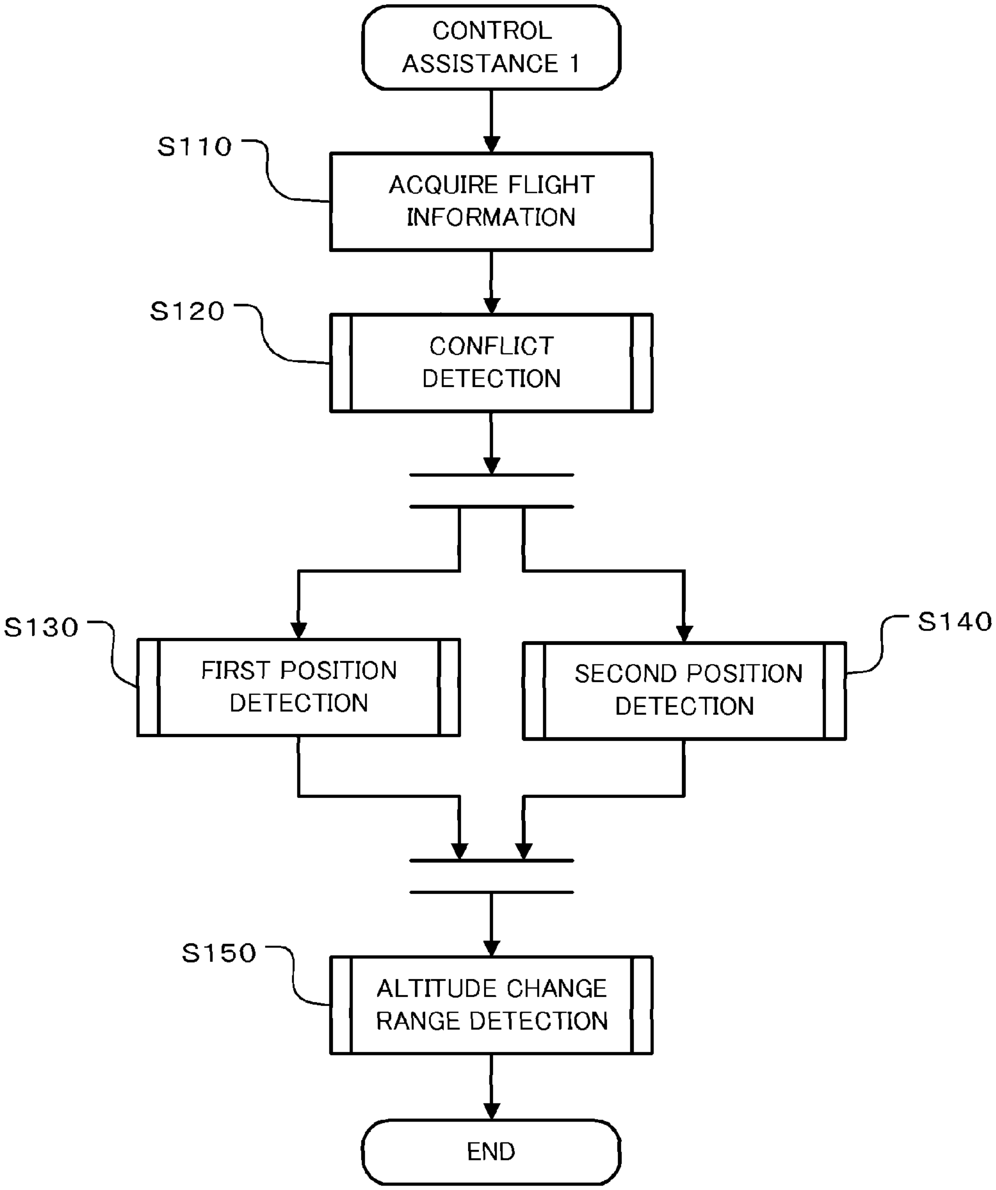
FIG. 8 is a flowchart showing an example of the action of control assistance according to the first preferred embodiment.

FIG. 8 is a flowchart showing an example of the action of control assistance according to the first preferred embodiment. The flight information acquirer 10 acquires flight information from the flight information memory and sends this information to the approach detector 20, the first position detector 30 and the second position detector 40 (step S110).

The approach detector 20 accomplishes the above-described conflict detection for each partial route at each altitude of the target craft, and generates the conflict range information shown in FIG. 4. The approach detector 20 sends the generated conflict range information to the first position detector 30, the second position detector 40 and the altitude change detector 50 (step S120).

Figure 9:
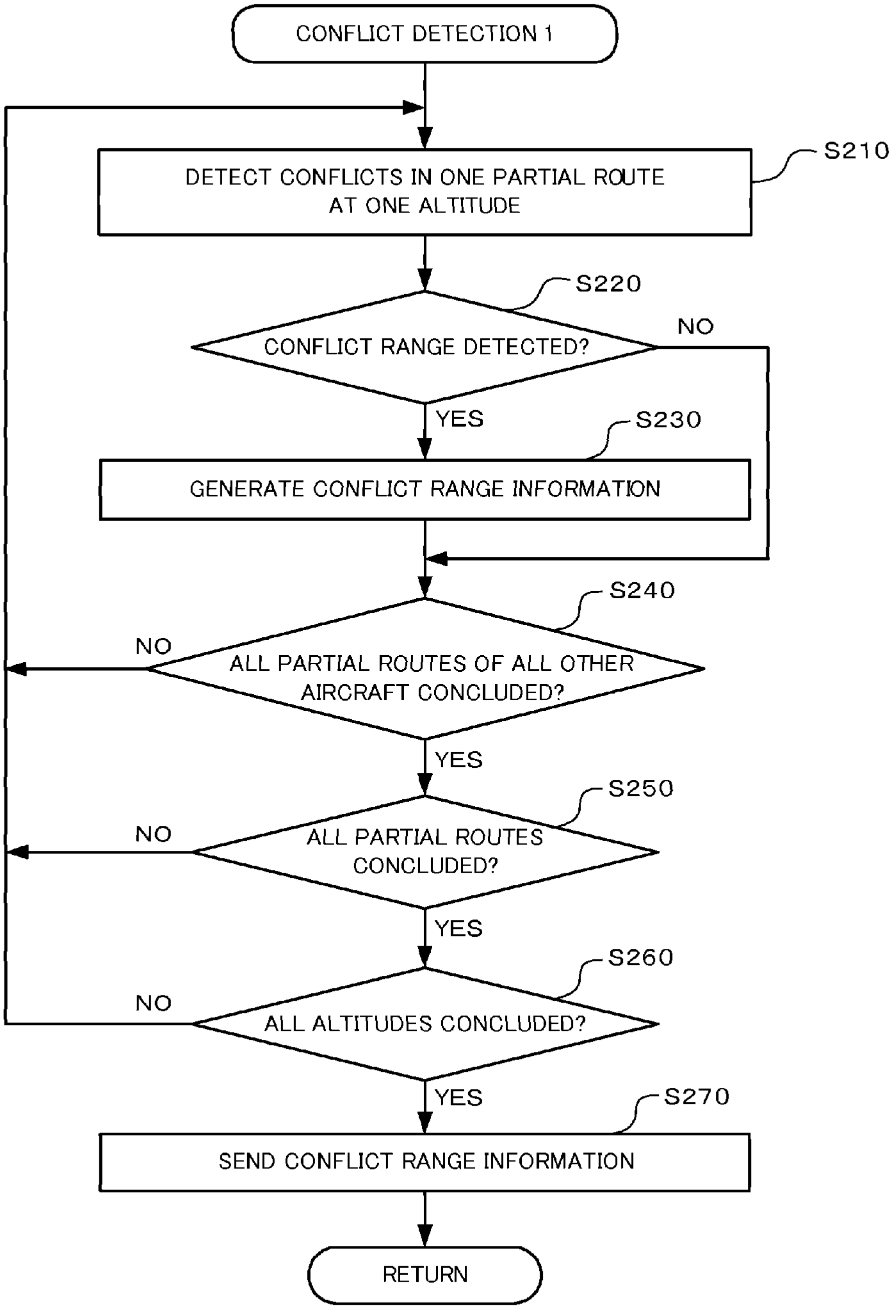
FIG. 9 is a flowchart showing an example of the action of conflict detection according to the first preferred embodiment.

FIG. 9 is a flowchart showing an example of the action of conflict detection according to the first preferred embodiment. This is detail of step S120 in FIG. 8. Conflict detection accomplished by the approach detector 20 is explained below. For example, the approach detector 20 selects the partial route FIX01-02 of the aircraft named APL001 at altitude 40 and the partial route FIX11-10 of the aircraft named APL002 at altitude 39 and accomplishes conflict detection (step S210). Because no conflict range is detected (step S220: No), the approach detector 20 does not generate conflict range information. Because conflict detection has not ended between the partial route FIX01-02 of the aircraft named APL001 at altitude 40 and all partial routes of all other aircraft (step S240: No), the approach detector 20 returns to step S210 and repeats the above-described conflict detection.

Furthermore, the approach detector 20 concludes conflict detection between the partial route FIX01-02 of the aircraft named APL001 at altitude 40 and all partial routes of all other aircraft (step S240: Yes). Because conflict detection has not been concluded between all partial routes of the aircraft named APL001 and all partial routes of all other aircraft (step S250: No), the approach detector 20 returns to step S210 and repeats the above-described conflict detection, and concludes conflict detection between all partial routes of the aircraft named APL001 at altitude 40 and all partial routes of all other aircraft (step S240: Yes; step S250: Yes). Because no conflict range is detected at altitude 40, the approach detector 20 does not generate conflict range information.

Because conflict detection has not concluded between all partial routes of the aircraft named APL001 at all altitudes and all partial routes of all other aircraft (step S260: No), the approach detector 20 returns to step S210 and repeats the above-described conflict detection at another altitude, for example altitude 39. Because a conflict was detected between the partial route FIX08-09 of the aircraft named APL001 and the partial route FIX09-08 of the aircraft named APL002 in the range from transit time 02:00 to transit time 02:07 (steps S210, S220: Yes), the approach detector 20 generates conflict range information (step S230).

When the approach detector 20 has concluded conflict detection in this manner between the target craft and all other aircraft in all partial routes of the target craft at all altitudes (step S240: Yes; step S250: Yes; step S260: Yes), the conflict range information shown in FIG. 4 is sent to the first position detector 30, the second position detector 40 and the altitude change detector 50 (step S270).

The above-described repeating method of conflict detection is one example, and the approach detector 20 may be comprised so as to accomplish conflict detection between the target craft and all other aircraft on all partial routes of the target craft at all altitudes by repeating conflict detection using a method other than the above-described method.

Returning to FIG. 8, when the approach detector 20 concludes conflict detection (step S120 in FIG. 8), the first position detector 30 accomplishes detection of the above-described first position and generates first position information. The first position detector 30 sends the generated first position information to the altitude change detector 50 (step S130).

Figure 10:
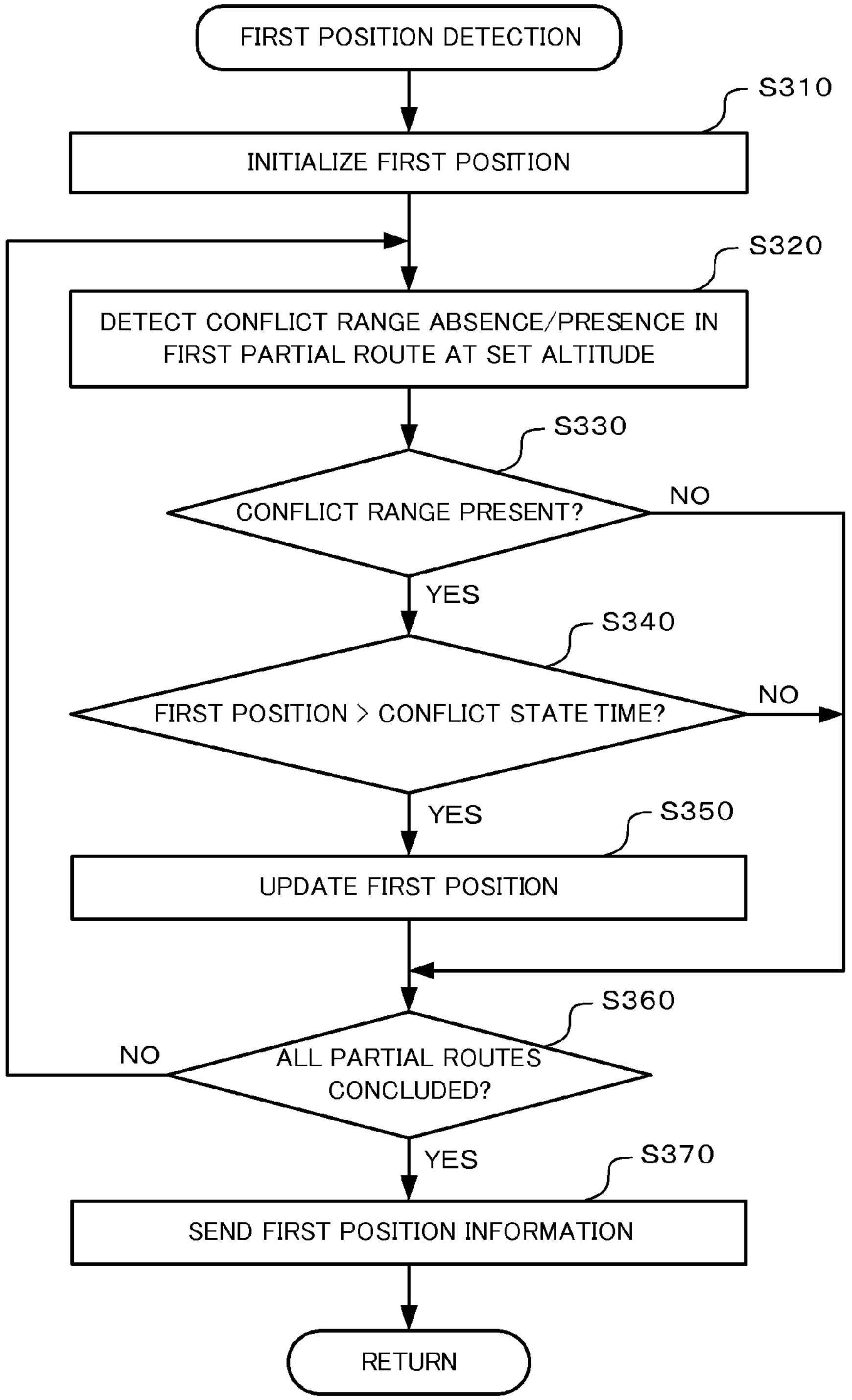
FIG. 10 is a flowchart showing an example of the action of first position detection according to the first preferred embodiment.

FIG. 10 is a flowchart showing an example of the action of first position detection according to the first preferred embodiment. This is detail of step S130 in FIG. 8. First position detection accomplished by the first position detector 30 is explained below. The first position detector 30 initializes the first position t_hcur with an arbitrary value later than the time at which the target craft withdraws from the controlled airspace (step S310). The first position detector 30 selects the partial route FIX01-02 of the aircraft named APL001 at the set altitude 39, and detects the absence or presence of a conflict range (step S320). Because there is no conflict range (step S330: No), the first position detector 30 does not update the first position t_hcur.

Because detection of the absence or presence of conflict ranges has not concluded for all partial routes of the aircraft named APL001 at the set altitude 39 (step S360: No), the first position detector 30 returns to step S320 and repeats the above-described detection for the absence or presence of conflict ranges. Furthermore, when the first position detector 30 detects that there is a conflict range with a start time of 02:00 and an end time of 02:07 in the partial route FIX08-09 of the aircraft named APL001 (steps S320, S330: Yes), the first position detector 30 determines whether or not the first position t_hcur is a time later than the start time 02:00 of the detected conflict range. In this case, the first position t_hcur is the initial value and is a time later than the start time 02:00 of the detected conflict range (step S340: Yes), so the first position detector 30 updates the value of the first position t_hcur with the start time 02:00 of the detected conflict range (step S350). When the first position t_hcur is not a time later than the start time 02:00 of the detected conflict range (step S340: No), the first position detector 30 does not update the first position t_hcur.

In this manner, when the first position detector 30 detects the first position at the set altitude 39 and generates the first position information (step S360: Yes), the first position t_hcur becomes 02:00. The first position detector 30 sends the first position information including the first position t_hcur to the altitude change detector 50 (step S370).

Returning to FIG. 8, in parallel with first position detection (step S130 in FIG. 8), the second position detector 40 accomplishes detection of the above-described second position and generates the second position information shown in FIG. 5B. The second position detector 40 sends the generated second position information to the altitude change detector 50 (step S140). The first position detection of step S130 and the second position detection of step S140 may be comprised so as to be accomplished in sequence, and in this case the ordering of steps S130 and S140 makes no difference.

Figure 11:
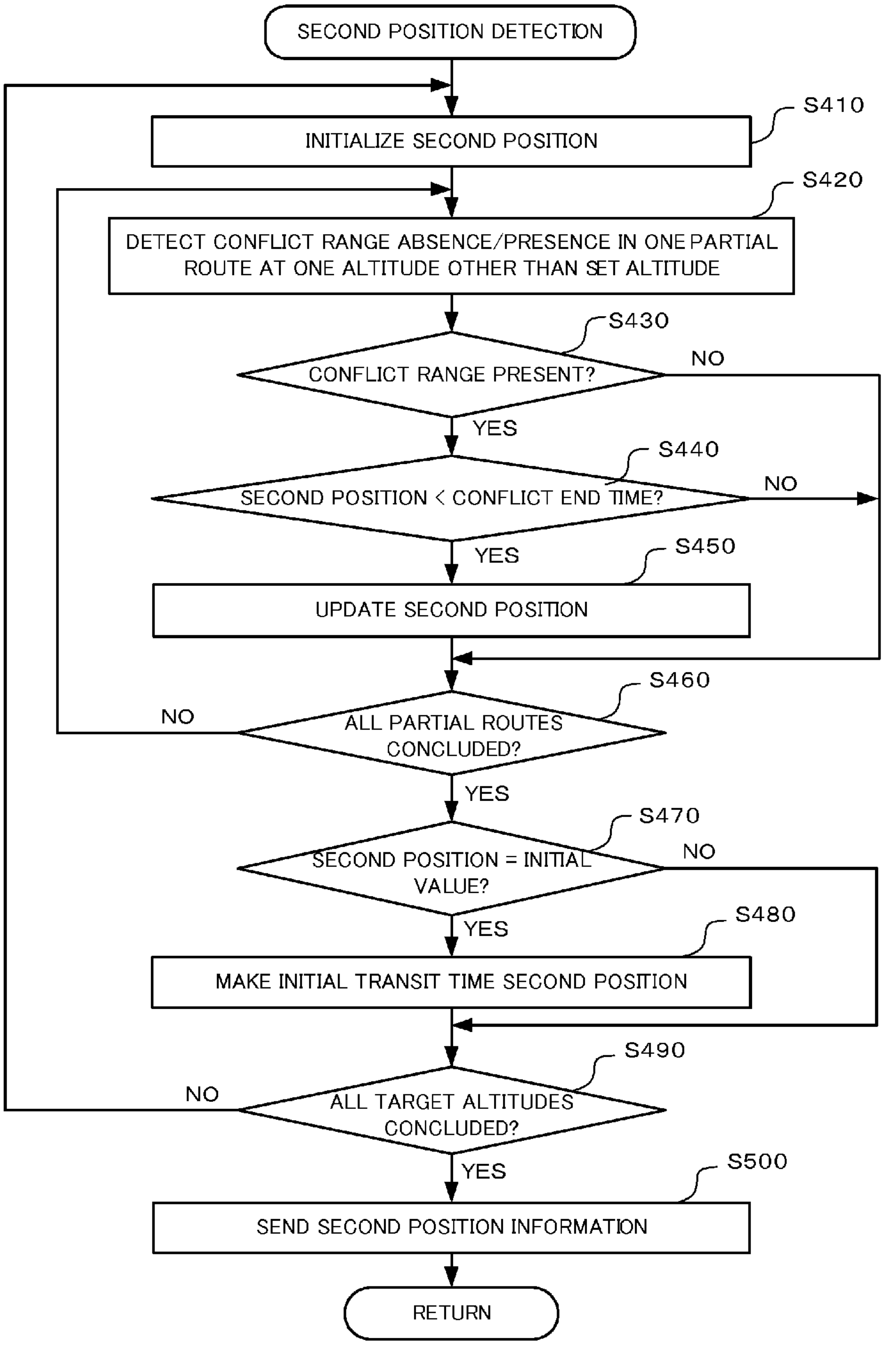
FIG. 11 is a flowchart showing an example of the action of second position detection according to the first preferred embodiment.

FIG. 11 is a flowchart showing an example of the action of second position detection according to the first preferred embodiment. This is detail of step S140 in FIG. 8. Second position detection as accomplished by the second position detector 40 is explained below. For example, the second position detector 40 initializes the second position t_h at the altitude 40 to 0 (step S410). The second position detector 40 selects the partial route FIX01-02 of the aircraft named APL001 at the altitude 40 and detects the absence or presence of a conflict range (step S420). Because there is no conflict range (step S430: No), the second position detector 40 does not update the second position t_h.

Because detection of the absence or presence of a conflict range is not concluded for all partial routes of the aircraft named APL001 at the altitude 40 (step S460: No), the second position detector 40 returns to step S420 and repeats the above-described detection of the absence or presence of a conflict range. Because there is no conflict range at the altitude 40, even when detection of the absence or presence of conflict ranges is concluded for all partial routes of the aircraft named APL001 (step S460: Yes), the second position t_h is still at the initial value of 0. Upon detecting that the second position t_h is at the initial value of 0 (step S470: Yes), the second position detector 40 updates the second position t_h with the earliest transit time of the target craft set in the flight information. In this case, the second position detector 40 updates the second position t_h with 00:45, the earliest transit time of the craft named APL001 (step S480).

Because the above-described detection of the absence or presence of conflict ranges and comparison of the end times of the detected conflict ranges and the second position t_h on all partial routes of the aircraft named APL001 at all altitudes other than the set altitude of the target craft has not been concluded (step S490: No), the second position detector 40 returns to step S410 and repeats the steps from second position initialization. The second position detector 40 repeats the above-described detection of the absence or presence of a conflict range and comparison of the end time of detected conflict ranges with the second position t_h for each partial route of the aircraft named APL001 at another altitude, for example at the altitude 37. Furthermore, when the second position detector 40 detects a conflict range having a start time of 01:02 and an end time of 01:10 (steps S420, S430: Yes) in the partial route FIX03-04 of the aircraft named APL001, the second position detector 40 determines whether or not the second position t_h is a time earlier than the end time 01:10 of the detected conflict range. In this case, the second position t_h is the initial value of 0 and thus is a time earlier than the end time of 01:10 of the detected conflict range (step S440: Yes), so the second position detector 40 updates the value of the second position t_h with the end time 01:10 of the detected conflict range (step S450).

When detection of the absence or presence of conflict ranges and comparison of the end times of detected conflict ranges with the second position t_h is concluded for all partial routes of the aircraft named APL001 by repeating the above-described process at the altitude 37 (step S460: Yes), the second position t_h at the altitude 37 is not the initial value of 0 (step S470: No), but is 03:18.

When the second position detector 40 has detected the second position at all altitudes other than the set altitude of the target craft in this manner and generates the second position information (step S490: Yes), the second position detector 40 sends the second position information shown in FIG. 5 to the altitude change detector 50 (step S500).

Returning to FIG. 8, when the first position detector 30 concludes first position detection (step S130 in FIG. 8) and the second position detector 40 concludes second position detection (step S140), the altitude change detector 50 accomplishes the above-described detection of an altitude change range and generates the altitude change range information shown in FIG. 6 (step S150).

Figure 12:
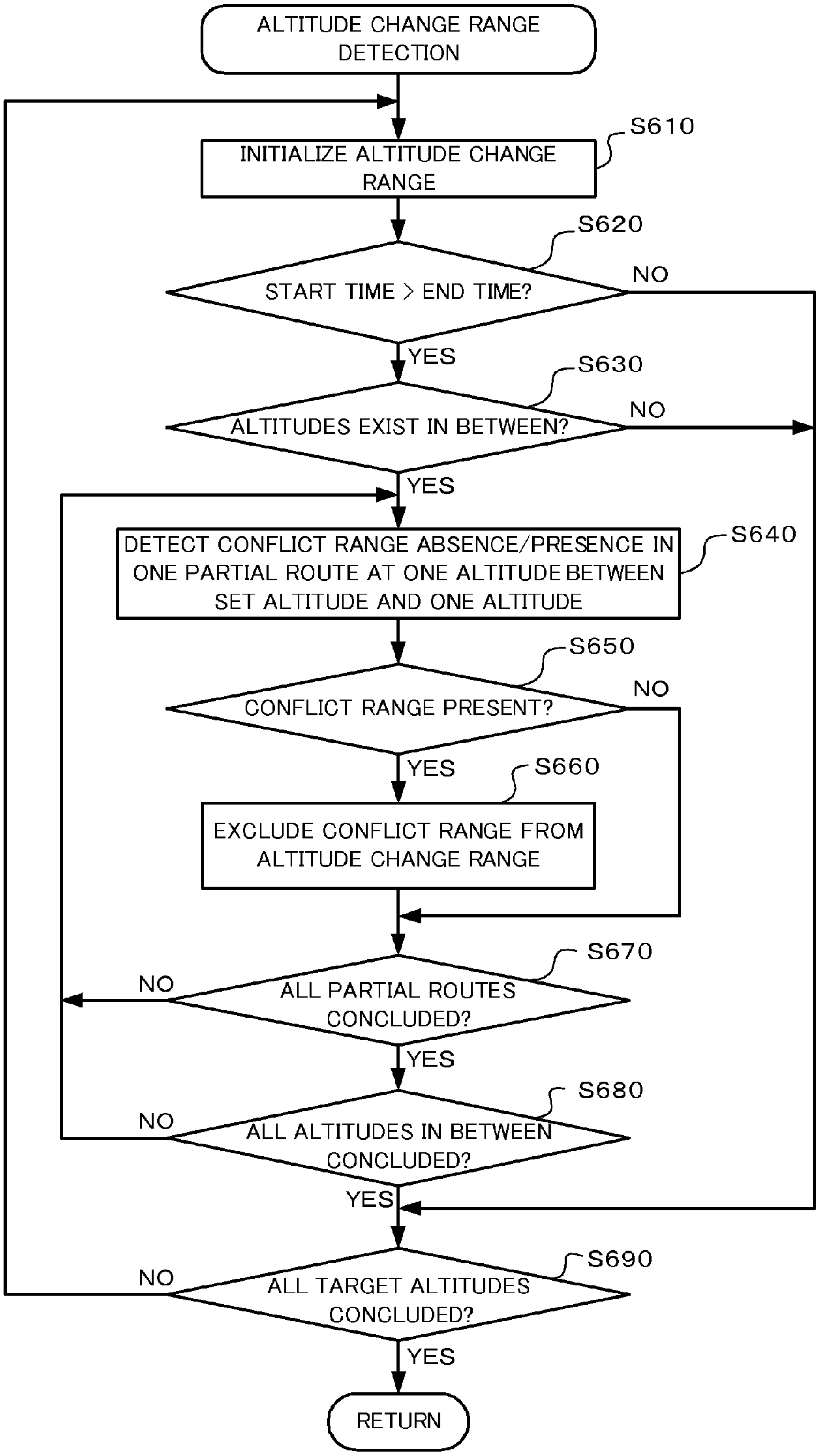
FIG. 12 is a flowchart showing an example of the action of altitude change range detection according to the first preferred embodiment.

FIG. 12 is a flowchart showing an example of the action of altitude change range detection according to the first preferred embodiment. This is detail of step S150 in FIG. 8. The altitude change range detection accomplished by the altitude change detector 50 is explained below. For example, the altitude change detector 50 initializes the start time of the altitude change range at the altitude 37 as the second position t_h at the altitude 37 and the end position of the altitude change range as the first position t_hcur (step S610). That is to say, the start time of the altitude change range at the altitude 37 is 03:18 and the end time is 02:00. The altitude change detector 50 determines whether or not the start time is an earlier time than the end time. Because the start time is not an earlier time than the end time (step S620: No), the altitude change detector 50 determines that there is not altitude change range at the altitude 37.

Because altitude change ranges have not been detected at all altitudes other than the set altitude of the target craft (step S690: No), the altitude change detector 50 returns to the step S610 and repeats the process from the altitude change range initialization. The altitude change detector 50 initializes the start time of the altitude change range at the altitude 40, for example, as 00:45 and initializes the end time as 02:00 (step S610). Because the start time 00:45 is an earlier time than the end time 02:00 (step S620: Yes), the altitude change detector 50 detects whether or not there is an altitude between the set altitude 39 and the altitude 40. Because there is no altitude between the set altitude 39 and the altitude 40 (step S630: No), the altitude change range at the altitude 40 remains at the initial value.

Because detection of altitude change ranges has not been concluded for all altitudes other than the set altitude of the target craft (step S690: No), the altitude change detector 50 returns to step S610 and repeats the process from the altitude change range initialization. The altitude change detector 50 initializes the start time of the altitude change range at another altitude, for example at the altitude 36, as 00:45 and initializes the end time as 02:00 (step S610). Because the start time 00:45 is an earlier time than the end time 02:00 (step S620: Yes), the altitude change detector 50 detects whether or not there is an altitude between the set altitude of 39 and the altitude 36 (step S630).

Because the navigable altitudes 37 and 38 exist between the set altitude 39 and the altitude 36 (step S630: Yes), the altitude change detector 50 selects the partial route FIX01-02 of the aircraft named APL001 at the altitude 38, for example, and detects the absence or presence of conflict ranges (step S640). Because there is no conflict range (step S650: No), the altitude change detector 50 does not update the altitude change range information. Because detection of the absence or presence of conflict ranges has not been concluded for all partial routes of the aircraft named APL001 at the altitude 38

(step S670: No), the altitude change detector 50 returns to step S640 and repeats the above-described detection of the absence or presence of conflict ranges. Because there is no conflict range at the altitude 38, the altitude change range at the altitude 36 is not changed.

Because detection of the absence or presence of conflict ranges has not been concluded for all altitudes between the set altitude 39 and the altitude 36 (step S680: No), the altitude change detector 50 returns to step S640 and repeats the above-described detection of the absence or presence of conflict ranges at the altitude 37. Furthermore, the altitude change detector 50 detects a conflict range having a start time of 01:02 and an end time of 01:10 in the partial route FIX03-04 of the aircraft named APL001 (step S640). Because there is a conflict range (step S650: Yes), the altitude change detector 50 excludes the detected conflict range, that is to say the range from the stat time 01:02 to the end time 01:10, from the altitude change range (step S660). The above-described process is repeated for all partial routes of the aircraft named APL001 at the altitude 37, and when the detection of the absence or presence of conflict ranges and exclusion of detected conflict ranges from the altitude changeable range is concluded for all partial routes at all altitudes between the set altitude 39 and the altitude 36 (step S670:Yes; S680: Yes), from the start time 01:10 to the end time 02:00 in which a conflict range was detected has been excluded, so the start time of the altitude change range at the altitude 36 becomes 00:45 and the end time becomes 01:02.

In this manner, when the altitude change detector 50 detects the altitude change range at all altitudes other than the set altitude of the target craft and generates altitude change range information (step S390: Yes), the altitude change range detection process concludes.

Returning to FIG. 8, when the altitude change detector 50 concludes altitude change range detection (step S150), the control assistance device 1 ends control assistance.

With the control assistance device 1 according to the first preferred embodiment as described above, the occurrence of conflicts is prevented by taking the entire controlled airspace into consideration, so route changes midway through partial routes are possible. Because conflict detection is accomplished between the target craft and all other aircraft in all partial routes of the target craft, it becomes possible to give control guidance preventing the occurrence of conflicts after comprehensively accomplishing conflict detection in the controlled airspace as a whole.

(Second preferred embodiment)

When an aircraft is flying in the controlled airspace, it is typical to fly at an altitude set in the flight information. In addition, the altitude is not something the aircraft can arbitrarily select, and is typically selected from among a number of navigable altitudes set within the controlled airspace. The altitude is set with a sufficient interval so that conflicts do not occur between aircraft flying at different altitudes, so example 10,000 feet, 11,000 feet, . . . , 35,000 feet.

Taking this into consideration, the control assistance device 1 according to a second preferred embodiment of the present invention, unlike the control assistance device 1 according to the first preferred embodiment, accomplishes conflict detection between the target craft and each other aircraft only when the altitude of the target craft is the same as the set altitude of the each other aircraft, for each partial route at each altitude of the target craft. Through this, the calculation burden in the conflict detection process can be reduced. In addition, the time until the control assistance device 1 outputs the altitude change range information can be shortened. The altitudes of two craft being the same does not mean they are flying at exactly the same altitude, but rather means they are flying at a division of the same altitude, within divisions of altitudes set with sufficient intervals as described above.

Figure 13:
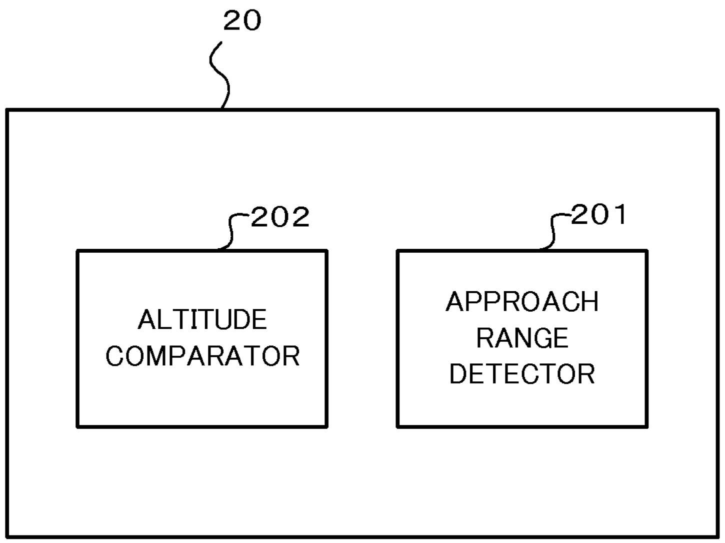
FIG. 13 is a block diagram showing an example of the composition of an approach detector according to a second preferred embodiment of the present invention.

The exemplary composition of the control assistance device 1 according to the second preferred embodiment of the present invention is the same as in FIG. 1, but conflict detection accomplished by the approach detector 20 differs from the first preferred embodiment. Conflict detection accomplished by the approach detector 20 according to the second preferred embodiment is explained below. FIG. 13 is a block diagram showing an exemplary composition of an approach detector according to the second preferred embodiment of the present invention. The approach detector 20 is provided with an approach range detector 201 and an altitude comparator 202.

The altitude comparator 202 selects, from the flight information, one partial route of the target craft at one altitude and one partial route of one other aircraft flying at a set altitude. The altitude comparator 202 accomplishes altitude comparison by determining whether or not the one altitude of the target craft is the same as the set altitude of the one other aircraft. Only when the altitude comparator 202 determines that the altitudes are the same the approach range detector 201 accomplish conflict detection between the target craft and the one other aircraft for the selected partial route of the target craft and the partial route of the one other aircraft, the same as in the first preferred embodiment.

The altitude comparator 202 and the approach range detector 201 repeat the above-described altitude comparison and conflict detection the same as the approach detector 20 according to the first preferred embodiment, accomplish conflict detection between the target craft and all other aircraft for all partial routes of the target craft, and generate conflict range information.

Figure 14:
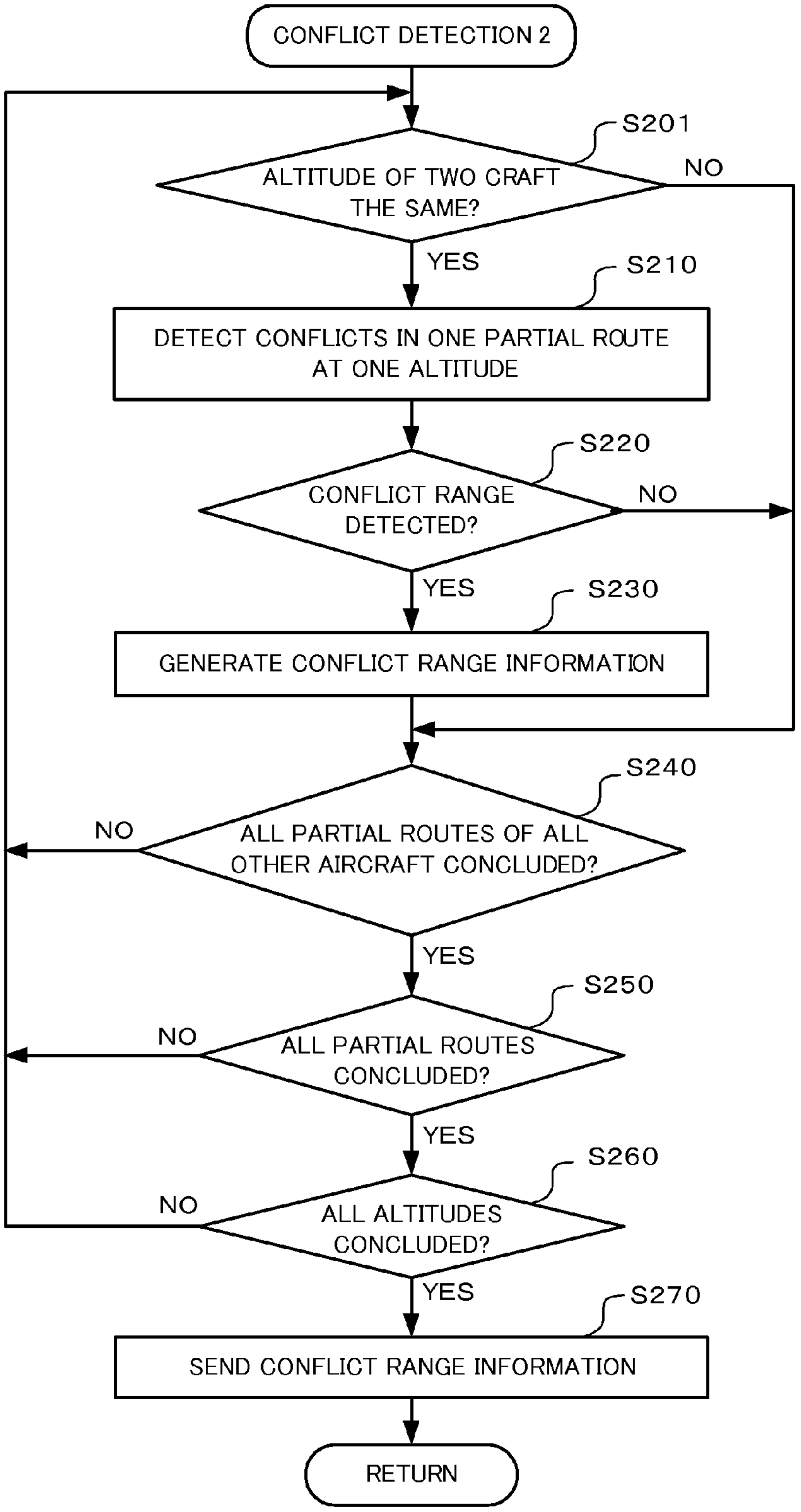
FIG. 14 is a flowchart showing an example of the action of conflict detection according to the second preferred embodiment.

The action of control assistance according to the second preferred embodiment is the same as in FIG. 8. Details of the process in step S120 of FIG. 8 differ from the first preferred embodiment, so these details are explained below. FIG. 14 is a flowchart showing an example of the action of conflict detection according to the second preferred embodiment. The altitude comparator 202 selects one partial route of the target craft at one altitude and selects one partial route of one other aircraft flying at a set altitude, and determines whether or not that one altitude is the same as the set altitude of the one other aircraft.

When the altitude comparator 202 determines that the one altitude is the same as the set altitude of the one other aircraft (step S201: Yes), the approach range detector 201 accomplishes conflict detection between the target craft and the one other aircraft, the same as in the first preferred embodiment (step S210). When the altitude comparator 202 determines that the one altitude is not the same as the set altitude of the one other aircraft (step S201: No), the approach range detector 201 does not accomplish conflict detection between the target craft and the one other aircraft. The processes from step S201 are the same as the actions of the first preferred embodiment shown in FIG. 9.

As explained above, with the control assistance device 1 according to the second preferred embodiment, it is possible to change routes midway through a partial route in order to prevent the occurrence of conflicts, taking into consideration the entirety of the controlled airspace. Furthermore, conflict detection is accomplished between the target craft and the one other aircraft only when the altitude of the target craft and the set altitude of the one other aircraft are the same. Consequently, the calculation burden in the conflict detection process is reduced, more efficient flight searches are accomplished and it is possible to more swiftly provide control guidance to prevent the occurrence of a conflict.

(Third preferred embodiment)

The control assistance device 1 according to a third preferred embodiment of the present invention, unlike the control assistance device 1 according to the first preferred embodiment, accomplishes conflict detection between the target craft and each other aircraft only when flight times in partial routes of the each other aircraft and flights times of the target craft overlap, for each partial route at each altitude of the target craft. Through this, the calculation burden of the conflict detection process is reduced. In addition, the time until the control assistance device 1 outputs altitude change range information is shortened.

Figure 15:
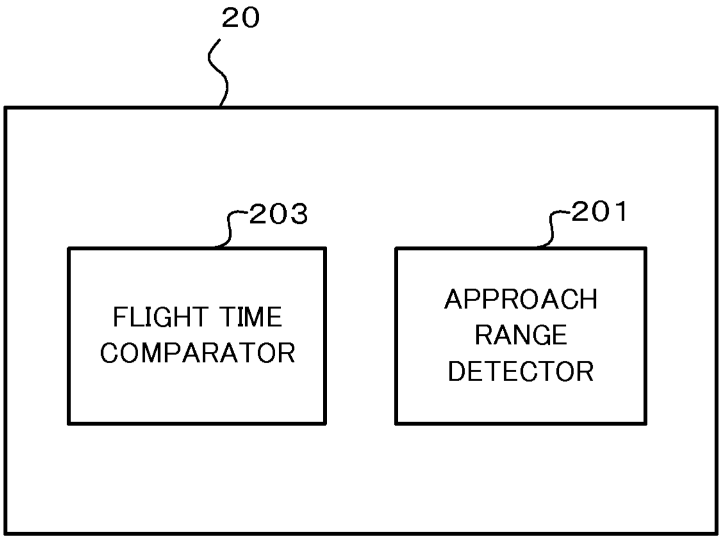
FIG. 15 is a block diagram showing an example of the composition of an approach detector according to a third preferred embodiment of the present invention.

An exemplary composition of the control assistance device 1 according to the third preferred embodiment of the present invention is the same as FIG. 1, but conflict detection accomplished by the approach detector 20 differs from the first preferred embodiment. Conflict detection accomplished by the approach detector 20 according to the third preferred embodiment is explained below. FIG. 15 is a block diagram showing an exemplary composition of the approach detector according to the third preferred embodiment of the present invention. The approach detector 20 is provided with an approach range detector 201 and a flight time comparator 203.

The flight time comparator 203 selects, from flight information, one partial route of the target craft at one altitude, and one partial route of one other aircraft flying at a set altitude. The flight time comparator 203 accomplishes flight time comparison determining whether or not there is overlap between the flight time in the one partial route of the target craft and the flight time in the partial route of the one other aircraft. That is to say, the flight time comparator 203 determines that there is an overlap in flight time when either the start time of the flight time of the target craft is before the end time of the flight time of the one other aircraft, or the end time of the flight time of the target craft is after the start time of the flight time of the one other aircraft.

The approach range detector 201 accomplishes conflict detection between the target craft and the one other aircraft for the selected partial route of the target craft and a partial route of the one other aircraft similar to the first preferred embodiment only when the flight time comparator 203 determines that there is overlap between the flight time in the partial route of the target craft and the flight time in the partial route of the one other aircraft.

Similar to the approach detector 20 according to the first preferred embodiment, the flight time comparator 203 and the approach detector 201 repeat the above-described flight time comparison and conflict detection, respectively, accomplish conflict detection between the target craft and all other aircraft in all partial routes of the target craft at all altitudes, and generate conflict range information.

Figure 16:
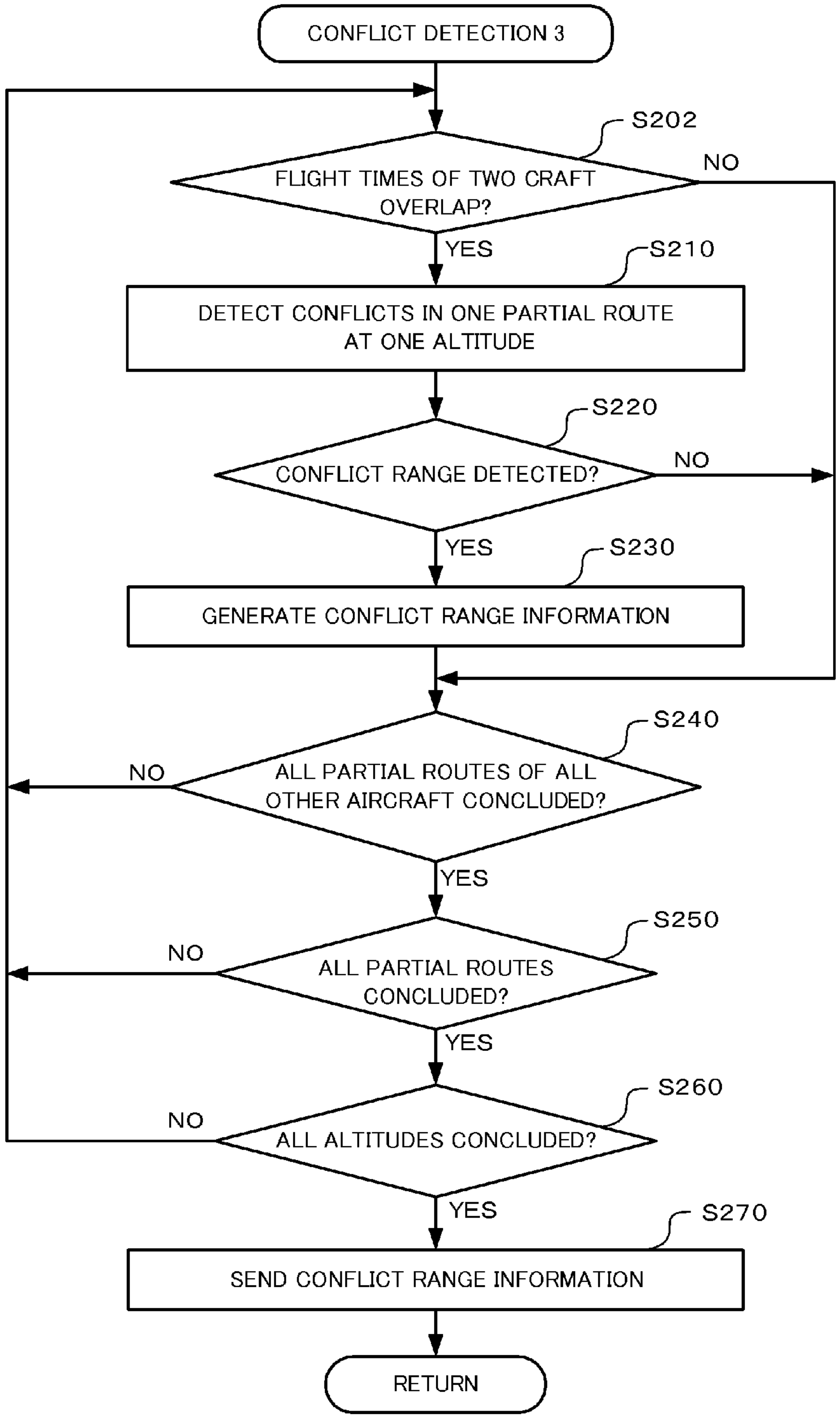
FIG. 16 is a flowchart showing an example of the action of conflict detection according to the third preferred embodiment.

The action of control assistance according to the third preferred embodiment is the same as FIG. 8. Details of the process in step S120 of FIG. 8 differ from the first preferred embodiment and thus are explained below. FIG. 16 is a flowchart showing an example of the action of conflict detection according to the third preferred embodiment. The flight time comparator 203 selects one partial route of the target craft flying at one altitude, and one partial route of the one other aircraft flying at the set altitude, and determines whether or not there is overlap between the flight time in the partial route of the target craft and the flight time in the partial route of the one other aircraft.

When the flight time comparator 203 determines that there is overlap between the flight time of the target craft and the flight time of the one other aircraft (step S202: Yes), the approach range detector 201 accomplishes conflict detection between the target craft and the one other aircraft for the selected partial route of the target craft and partial route of the one other aircraft, the same as in the first preferred embodiment (step S210). When the flight time comparator 203 determines that there is no overlap between the flight time of the target craft and the flight time of the one other aircraft (step S202: No), the approach range detector 201 does not accomplish conflict detection between the target craft and the one other aircraft. The process from step S210 is the same as the action of the first preferred embodiment shown in FIG. 9.

As explained above, with the control assistance device 1 according to the third preferred embodiment, it is possible to change routes in the middle of a partial route in order to prevent the occurrence of conflicts, taking into consideration the entirety of the controlled airspace. Furthermore, conflict detection is accomplished between the target craft and the one other aircraft only when there is overlap between the flight time of the target craft and the flight time of the one other craft. Consequently, the calculation burden of the conflict detection process is reduced, more efficient route searching is accomplished and it is possible to more swiftly provide control guidance for preventing the occurrence of conflicts.

(Fourth preferred embodiment)

When flying within the controlled airspace, an aircraft typically flies on partial routes that are line segments connecting two adjacent transit points, among the transit points set within the controlled airspace. In addition, when considering two aircraft flying in the same direction, for example an aircraft flying to North America from Kansai Airport and an aircraft flying to North America from Narita Airport, after departure differing partial routes are flown to a transit point, but there are many cases where consecutive common partial routes are flown after passing through a given transit point.

As explained in the first preferred embodiment, conflict detection can be accomplished on the basis of information such as collision safety intervals set surrounding aircraft, for example the same as in the prior art. Determining whether or not one partial route of the target craft and partial routes of each other aircraft approach the collision safety interval is accomplished, for example, based on whether or not the distance between the two craft approaches the collision safety interval from the starting transit point to the ending transit point, based on position information for each of the starting and ending transit points of one partial route and the times of transiting each transit point by both the target craft and the one other aircraft.

On the other hand, when the target craft and each of the other aircraft are flying on the same partial route and at the same altitude, or when the target craft and each of the other aircraft are flying at the same altitude and one partial route of the target craft and partial routes of each of the other aircraft are a portion of a series of common partial routes composed of two or more consecutive partial routes, the control assistance device 1 according to the fourth preferred embodiment of the present invention accomplishes the below conflict detection, which is simpler than that of the first preferred embodiment.

The control assistance device 1 detects as a conflict range a range in which the distance between two aircraft approaches the collision safety interval, using the distance between the two craft at the time when one out of the target craft or each of the other aircraft transits the starting transit point of that partial route, or the relative speeds of the two craft based on the speed of the target craft and the speed of each of the other aircraft, for each partial route at each altitude of the target craft. By accomplishing this kind of simple conflict detection, the calculation burden of the conflict detection process is reduced. In addition, the time until the control assistance device 1 outputs altitude change range information can be shortened.

Two craft flying the same partial route does not mean flying exactly the same line segment connecting two adjacent transit points as designated by longitude and latitude. A partial route is a belt-shaped space having a prescribed width, and when two craft are flying in the same belt-shaped space, the two craft may be considered to be flying the same partial route.

Similar to the second preferred embodiment, when two craft are flying the same altitude division, the two craft are considered to be flying at the same altitude.

Figures 17, 18:
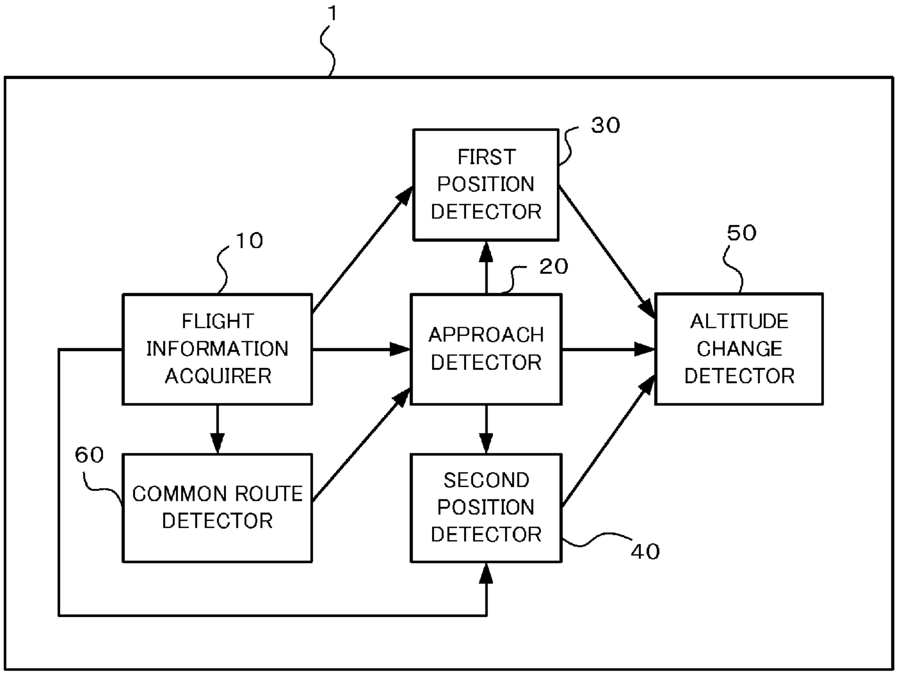
FIG. 17 is a block diagram showing an example of the composition of a control assistance device according to a fourth preferred embodiment of the present invention.
FIG. 18 is a drawing showing an example of common route information according to the fourth preferred embodiment.

FIG. 17 is a block diagram showing an exemplary composition of the control assistance device 1 according to the fourth preferred embodiment of the present invention. The control assistance device 1 comprises a flight information acquirer 10, an approach detector 20, a first position detector 30, a second position detector 40, an altitude change detector 50 and a common route detector 60. The actions of the flight information acquirer 10, the first position detector 30, the second position detector 40 and the altitude change detector 50 are the same as in the first preferred embodiment. However, the flight information acquirer 10 also sends acquired flight information to the common route detector 60.

The common route detector 60 detects as a common route, for each aircraft, a common partial route out of one or two or more partial routes an aircraft is flying and one or two or more partial routes the one other aircraft is flying, based on flight information received from the flight information acquirer 10. The common route detector 60 accomplishes common route detection for all aircraft and generates common route information containing common routes and information identifying the two aircraft. FIG. 18 is a drawing showing an example of common route information in the fourth preferred embodiment. The common route detector 60 sends the generated common route information to the approach detector 20.

In the example of FIG. 18, FIX01-02, FIX02-03 and FIX03-04, which are the common route of the aircraft named APL001 and the aircraft named APL003, are a series of common partial routes composed of two or more consecutive partial routes. When the aircraft named APL001 is flying FIX01-02 and the aircraft named APL003 is flying FIX03-04, this corresponds to the above-described case in which the one partial route of the target craft and the partial route of the one other aircraft are part of a series of common partial routes composed of two or more consecutive partial routes.

Figure 19:
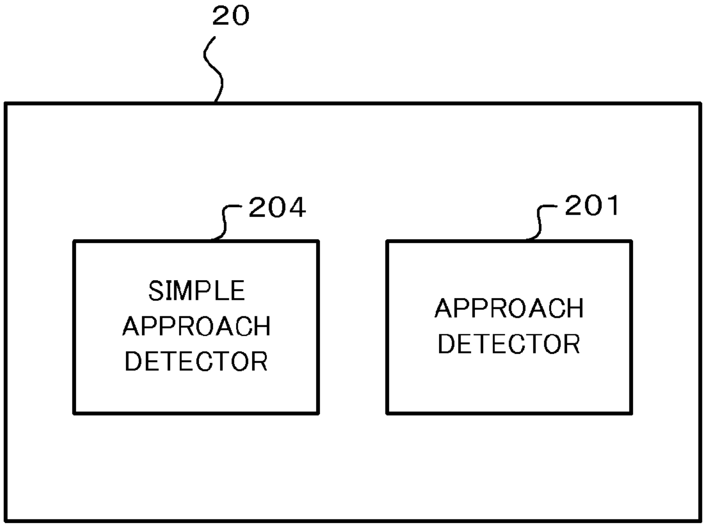
FIG. 19 is a block diagram showing an example of the composition of an approach detector according to the fourth preferred embodiment.

The conflict detection accomplished by the approach detector 20 and differing from the first preferred embodiment is explained below. FIG. 19 is a block diagram showing an exemplary composition of the approach detector according to the fourth preferred embodiment.

The approach detector 20 is provided with an approach range detector 201 and a simple approach detector 204.

The simple approach detector 204 selects from flight information one partial route of the target craft at one altitude and one partial route of one other aircraft flying at a set altitude.

The simple approach detector 204 accomplishes the below conflict detection between the target craft and the one other aircraft for the selected partial route of the target craft and partial route of the one other aircraft only when the one altitude and the set altitude of the one other aircraft are the same, the partial route of the target craft and the partial route of the one other aircraft correspond to a common route, and furthermore the one partial route of the target craft and the partial route of the one other aircraft are the same or the one partial route of the target craft and the partial route of the one other aircraft are a portion of a series of common routes composed of consecutive common routes.

The simple approach detector 204 calculates the distance between the target craft and the one other aircraft at a time when the target craft or the one other aircraft flies through the starting transit point of the one partial route. The simple approach detector 204 calculates the speeds of the target craft and the one other aircraft in the first partial route based on flight information, and calculates the relative speed of the two craft.

When the speed of the target craft is at least as great as the speed of the one other aircraft, the start time of the conflict range is taken as t and the end time is the time when the target craft transits the ending transit point of the one partial route. However, t is the solution to the below linear equation. When t is a time later than the time when the target craft transits the ending transit point of the one partial route, no conflict range is taken to exist.

The distance between the two craft at the time when the target craft transits the starting transit point of the one partial route is $d_{12}$. The relative speed of the two craft found by subtracting the speed of the one other aircraft from the speed of the target craft in the one partial range is $v_{12}$. The time when the target craft transits the starting transit point of the one partial route is $t_S$.

$$d_{12}-v_{12}\times(t-t_S)=\text{collision safety interval}$$

When the speed of the target craft is smaller than the speed of the one other aircraft, the start time of the conflict range is taken as t' and the end time is the time when the target craft transits the ending transit point of the one partial route. However, t' is the solution to the below linear equation. When t' is a time later than the time when the target craft transits the ending transit point of the one partial route, no conflict range is taken to exist.

The distance between the two craft at the time when the one other craft transits the starting transit point of the one partial route is $d'_{12}$. The relative speed of the two craft found by subtracting the speed of the target craft from the speed of the one other aircraft in the one partial range is $v'_{12}$. The time when the one other craft transits the starting transit point of the one partial route is $t'_S$.

$$d'_{12}-v'_{12}\times(t'-t'_S)=\text{collision safety interval}$$

When the simple approach detector 204 does not accomplish conflict detection, the approach range detector 201 accomplishes conflict detection between the target craft and the one other aircraft for the selected partial route of the target craft and partial route of the one other aircraft, similar to the first preferred embodiment. Similar to the approach detector 20 according to the first preferred embodiment, the approach range detector 201 or the simple approach detector 204 repeats the above-described conflict detection, respectively, accomplishes conflict detection between the target craft and all other aircraft in all partial routes of the target craft at all altitudes, and generates conflict range information.

Figure 20:
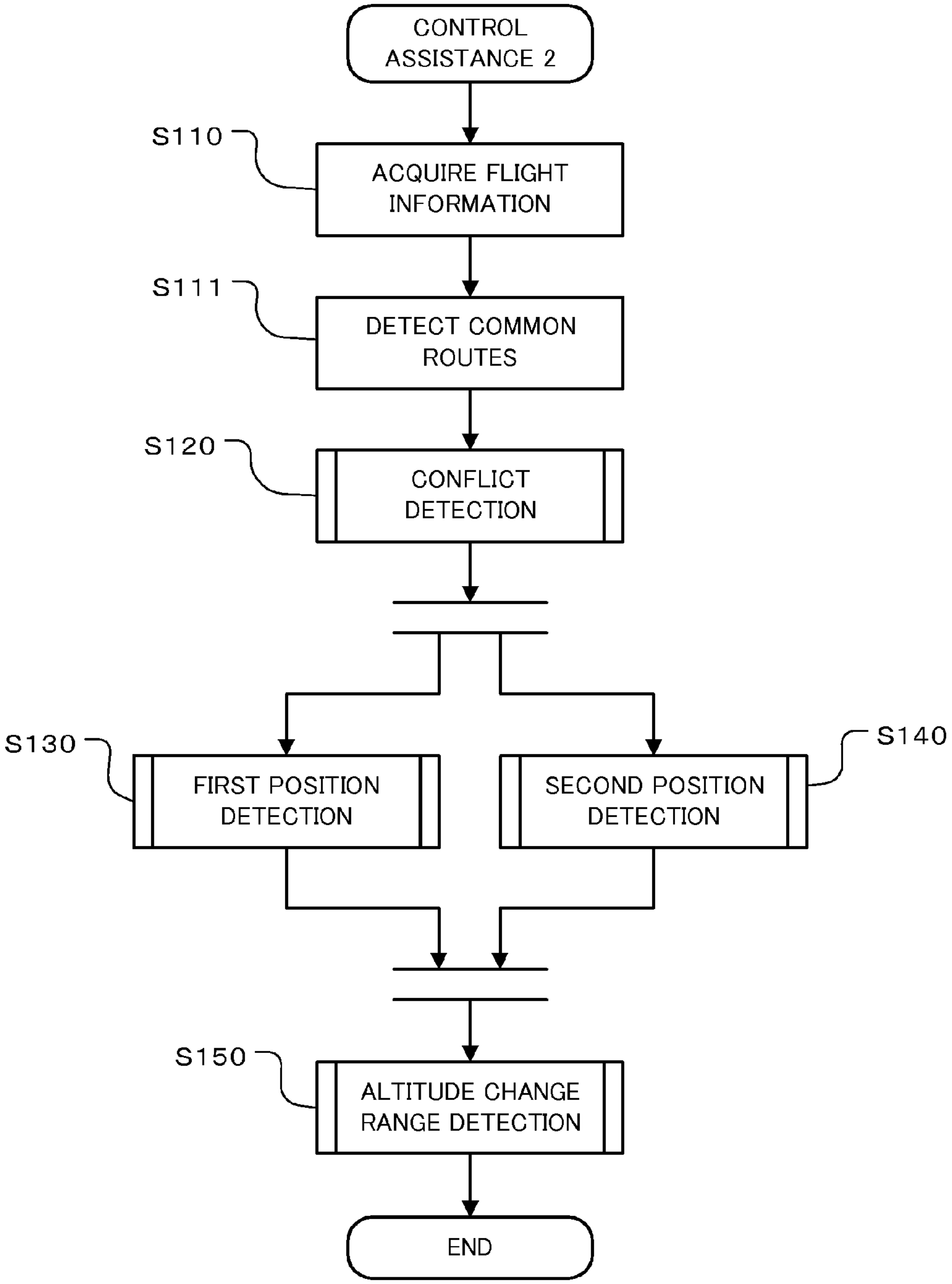
FIG. 20 is a flowchart showing an example of the action of control assistance according to the fourth preferred embodiment.

FIG. 20 is a flowchart showing an example of the action of control assistance according to the fourth preferred embodiment. Step S110 and the steps from step S130 are the same as the action of the first preferred embodiment shown in FIG. 8. Step S111 will be explained. The common route detector 60 accomplishes the above-described common route detection for each aircraft and generates the common route information. The common route detector 60 sends the generated common route information to the approach detector 20 (step S111).

Figure 21:
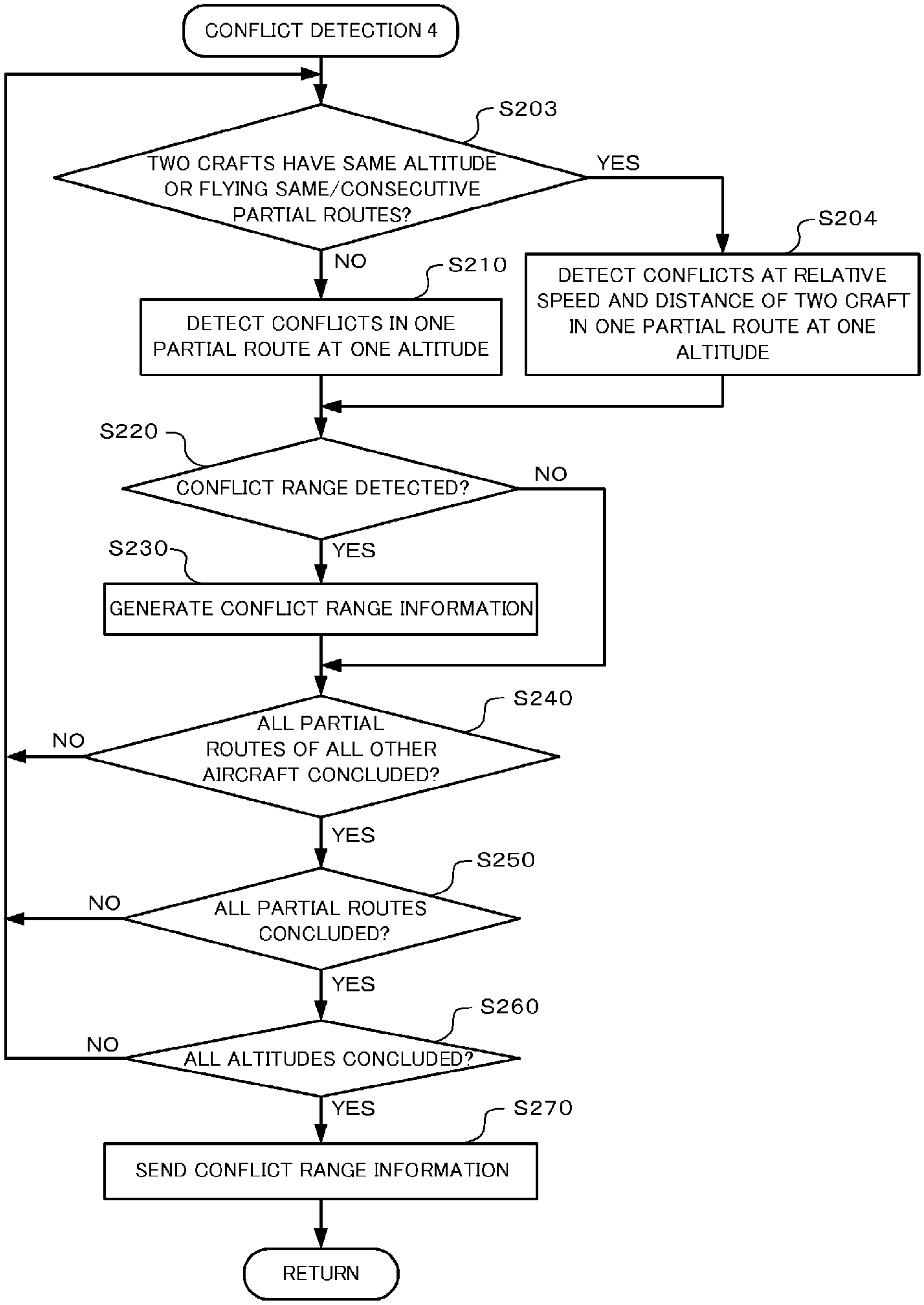
FIG. 21 is a flowchart showing an example of the action of conflict detection according to the fourth preferred embodiment.

FIG. 21 is a flowchart showing one example of the action of conflict detection according to the fourth preferred embodiment. This is the detail of step S120 in FIG. 20. The simple approach detector 204 selects one partial route of the target craft at one altitude and one partial route of the one other aircraft flying at the set altitude, from the flight information.

When the one altitude and the set altitude of the one other aircraft as the same, and the partial route of the target craft and the one partial route of the one other aircraft correspond to a common route, and furthermore the one partial route of the target craft and the one partial route of the one other aircraft are the same, or the one partial route of the target craft and the partial route of the one other aircraft are part of a series of common routes composed of consecutive common routes (step S203: Yes), the simple approach detector 204 accomplishes conflict detection between the target craft and the one other aircraft for the selected one partial route of the target craft and one partial route of the one other aircraft, using the relative speed and distance of the target craft and the one other aircraft as described above (step S204).

Other than when the above-described simple approach detector 204 is accomplishing conflict detection (step S203: No), the approach range detector 201 accomplishes conflict detection between the target craft and the one other aircraft the same as in the first preferred embodiment (step S210). The process after step S210 is the same as the actions of the first preferred embodiment shown in FIG. 9.

As explained above, with the control assistance device according to the fourth preferred embodiment, it is possible to change routes in the middle of a partial route in order to prevent the occurrence of conflicts, taking the controlled airspace as a whole into consideration.

Furthermore, when prescribed conditions are satisfied, simple conflict detection is accomplished between the target craft and each other aircraft, using the relative speed and distance of the target craft and the one other craft. Consequently, the calculation burden of the conflict detection process can be reduced, more efficient route searching can be accomplished and control guidance for preventing the occurrence of conflicts can be given more swiftly.

(Fifth preferred embodiment)

When aircraft are flying in controlled airspace, typically the aircraft are flying on partial routes that are line segments connecting two adjacent transit points out of the transit points set in the controlled airspace. In addition, partial routes are not set between all arbitrary pairs of adjacent transit points, but rather the interval between two transit points set by the partial route depending on the flight direction of the aircraft is determined in advance to a certain degree and the number of partial routes is limited.

In consideration of this, the control assistance device 1 according to the fifth preferred embodiment of the present invention, unlike the first preferred embodiment, determines the necessity of conflict detection for each partial route in advance based on whether or not the occurrence of a conflict with other partial routes is expected. Furthermore, conflict detection is accomplished between the target craft and each other aircraft only when conflict detection is necessary between that partial route and the partial routes of each other aircraft flying at the set altitude, for partial routes at each altitude of the target craft. Through this, the calculation burden of the conflict detection process is reduced. In addition, the time for the control assistance device 1 to output the altitude change range information can be shortened.

Figure 22:
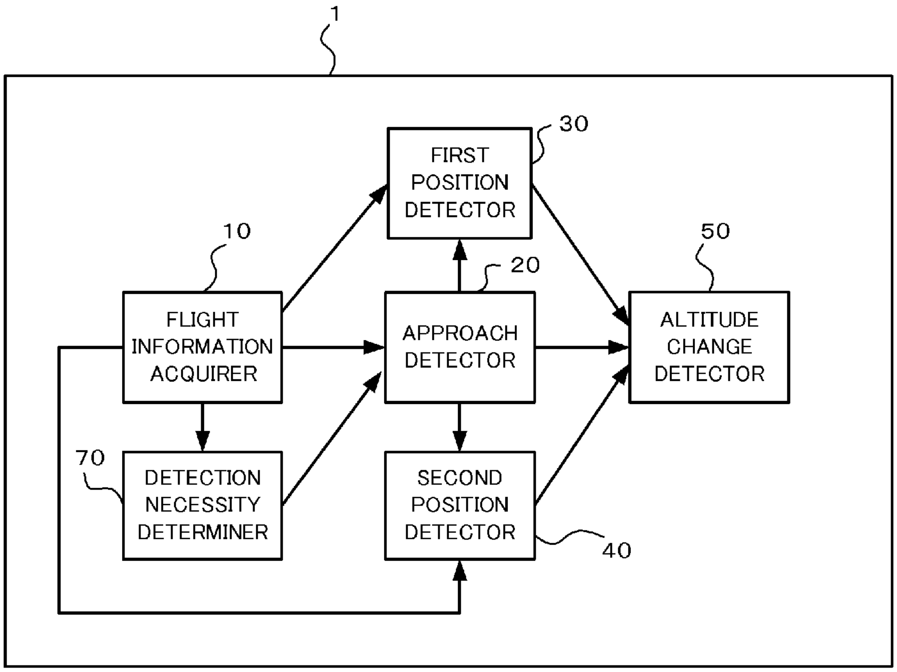
FIG. 22 is a block diagram showing an example of the composition of a control assistance device according to a fifth preferred embodiment of the present invention.

FIG. 22 is a block diagram showing an exemplary composition of the control assistance device 1 according to the fifth preferred embodiment of the present invention. The control assistance device 1 comprises a flight information acquirer 10, an approach detector 20, a first position detector 30, a second position detector 40, an altitude change detector 50 and a detection necessity determiner 70.

The actions of the flight information acquirer 10, the first position detector 30, the second position detector 40 and the altitude change detector 50 are the same as in the first preferred embodiment. The fight information acquirer 10 also sends the acquired flight information to the detection necessity determiner 70.

The detection necessity determiner 70 determines, for each partial route, whether or not conflict detection is necessary between that partial route and one other partial route based on the flight information received from the flight information acquirer 10. Using prior art, the detection necessity determiner 70 determines that conflict detection is necessary if the distance between the one partial route and the one other partial route has a range within the collision safety interval. The detection necessity determiner 70 determines that conflict detection is not necessary if the distance between the one partial route and the one other partial route has no range within the collision safety interval. The detection necessity determiner 70 accomplishes the above-described detection necessity determination for all partial routes and generates target route information containing one or two or more partial routes for which conflict detection is necessary. The detection necessity determiner 70 sends the generated target route information to the approach detector 20.

Conflict detection accomplished by the approach detector 20 differing from the first preferred embodiment is explained below. The approach detector 20 selects one partial route of the target craft at one altitude and one partial route of one other aircraft flying at a set altitude, from the flight information. The approach detector 20 determines whether or not conflict detection is necessary between the partial route of the target craft and the partial route of the one other aircraft based on the target route information. The approach detector 20 accomplishes conflict detection between the target craft and the one other aircraft for the selected partial route of the target craft and partial route of the one other aircraft the same as in the first preferred embodiment only when conflict detection is necessary between the partial route of the target craft and the partial route of the one other aircraft.

The approach detector 20 repeats conflict detection, accomplishes conflict detection between the target craft and all other aircraft on all partial routes of the target craft at all altitudes, and generates conflict range information.

Figure 23:
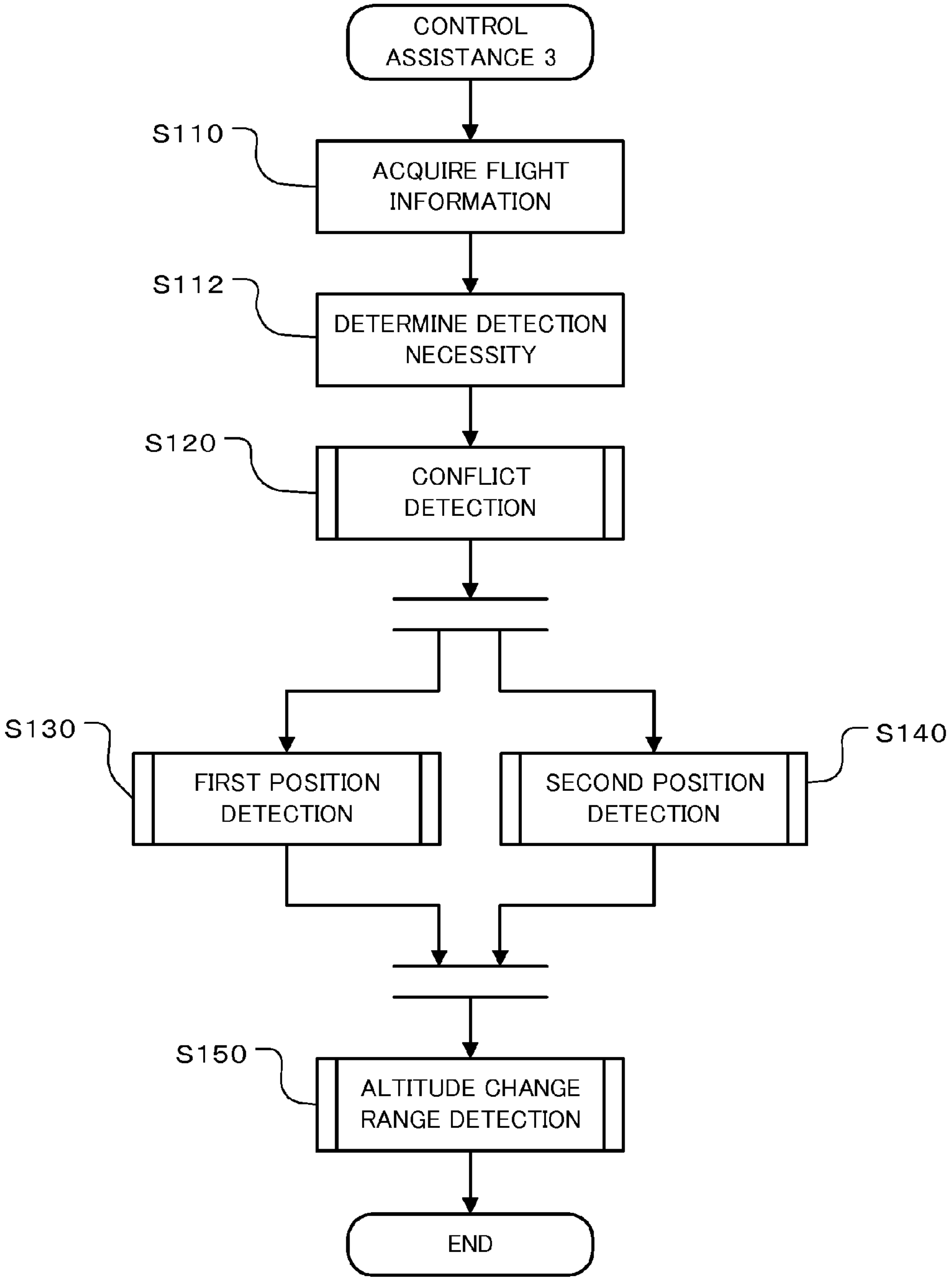
FIG. 23 is a flowchart showing an example of the action of control assistance according to the fifth preferred embodiment.

FIG. 23 is a flowchart showing an example of the action of control assistance according to the fifth preferred embodiment. Step S110 and from step S130 on are the same as the actions of the first preferred embodiment shown in FIG. 8. Step S112 will be explained.

The detection necessity determiner 70 accomplishes the above-described detection necessity determination for each partial route and generates target route information. The detection necessity determiner 70 sends the generated target route information to the approach detector 20 (step S112).

Figure 24:
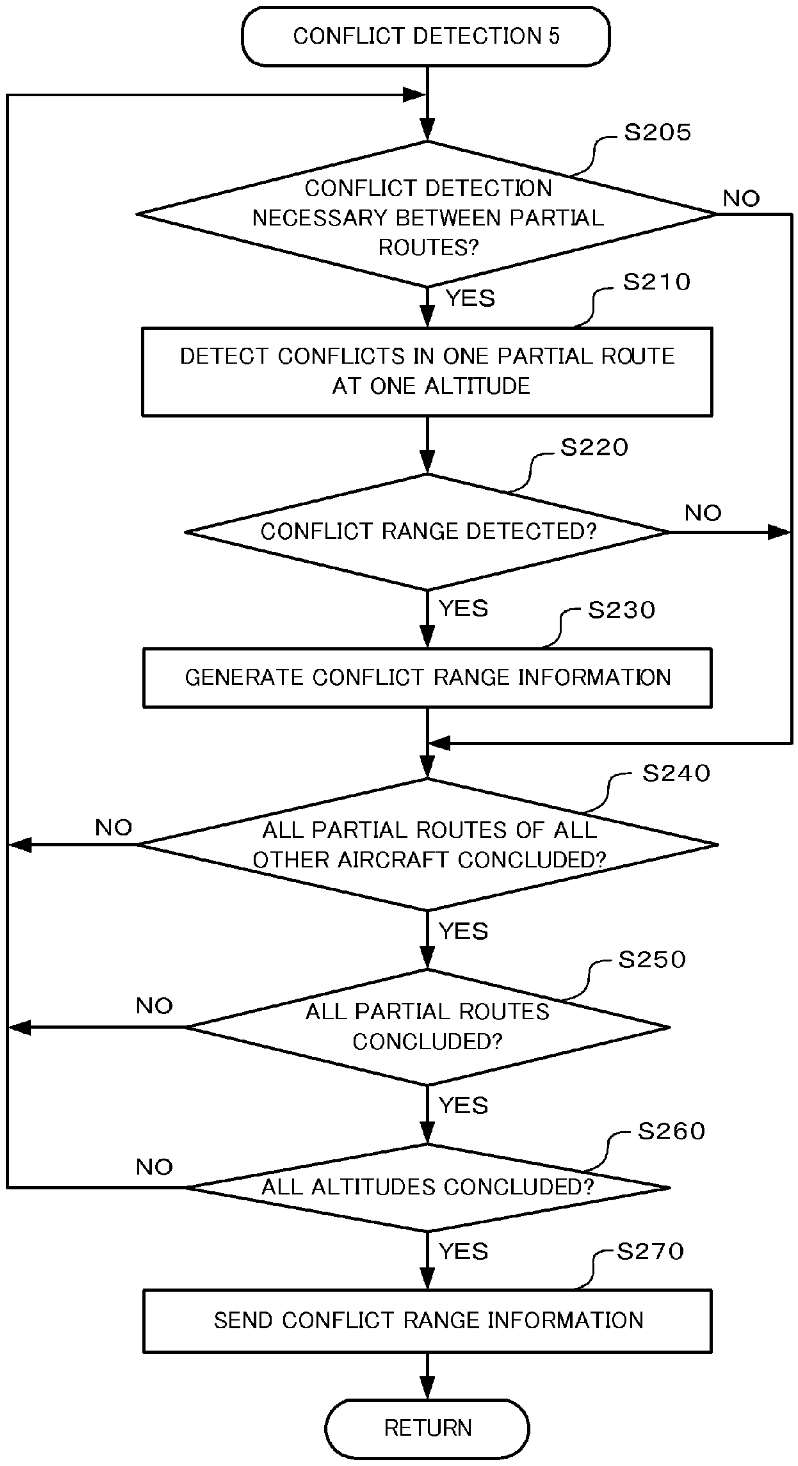
FIG. 24 is a flowchart showing an example of the action of conflict detection according to the fifth preferred embodiment.

FIG. 24 is a flowchart showing an example of the action of conflict detection according to the fifth preferred embodiment. This is detail of step S120 in FIG. 23. The approach detector 20 selects one partial route of the target craft at one altitude and one partial route of one other aircraft flying at the set altitude, from the flight information. The approach detector 20 determines whether or not conflict detection is necessary between the partial route of the target craft and the partial route of the one other aircraft, based on the target route information. When conflict detection is necessary between the partial route of the target craft and the partial route of the one other aircraft (step S205: Yes), the approach detector 20 accomplishes conflict detection between the target craft and the one other aircraft for the selected partial route of the target craft and partial route of the one other aircraft, the same as in the first preferred embodiment (step S210). When conflict detection is not necessary between the partial route of the target craft and the partial route of the one other aircraft (step S205: No), the approach detector 20 does not accomplish detection between the target craft and the one other aircraft. The process from step S210 on is the same as the actions of the first preferred embodiment shown in FIG. 9.

As explained above, with the control assistance device 1 according to the fifth preferred embodiment, it is possible to change routes midway through a partial route in order to prevent the occurrence of conflicts, taking into consideration the entirety of the controlled airspace. Furthermore, a determination is made as to whether or not conflict detection is necessary between partial routes by comparing partial routes in advance. Furthermore, conflict detection is accomplished between the target craft and the one other craft only when conflict detection is necessary between the partial route on which the target craft is flying and the partial route on which the one other aircraft is flying. Consequently, the calculation burden of the conflict detection process is reduced, more efficient route searching can be accomplished and it becomes possible to give control guidance more swiftly for preventing the occurrence of conflicts.

(Sixth preferred embodiment)

When aircraft are flying in controlled airspace, typically the aircraft are flying on partial routes that are line segments connecting two adjacent transit points out of the transit points set in the controlled airspace. The flight route on which one aircraft flies is composed of one or two or more partial routes.

In consideration of this, the control assistance device 1 according to a sixth preferred embodiment of the present invention determines whether or not the occurrence of conflicts is anticipated between a predetermined aircraft and each other aircraft, in addition to the detection necessity determination accomplished by the control assistance device according to the fifth preferred embodiment. The control assistance device 1 according to the sixth preferred embodiment determines, for each aircraft, that conflict detection between the aircraft and each other aircraft is unnecessary when the occurrence of a conflict between the partial routes is not anticipated in the combination of all partial routes, for all partial routes of that aircraft and all partial routes of each other aircraft. Conflict detection between that aircraft and each other aircraft is determined to be necessary when the occurrence of a conflict is anticipated in the combination of at least one partial route.

The control assistance device 1 according to the sixth preferred embodiment accomplishes conflict detection only when conflict detection is necessary between the target craft and each other aircraft for the partial route of the target craft at each altitude, and moreover when conflict detection is necessary between the partial route of the target craft and the partial route on which each other aircraft is flying at the set altitude, as explained in the fifth preferred embodiment. Through this, the calculation burden of the conflict detection process is reduced. In addition, the time until the control assistance device 1 outputs the altitude change range information can be shortened.

An exemplary composition of the control assistance device 1 according to the sixth preferred embodiment of the present invention is the same as FIG. 22. The actions of the flight information acquirer 10, the first position detector 30, the second position detector 40 and the altitude change detector 50 are the same as in the fifth preferred embodiment.

The detection necessity determiner 70 according to the sixth preferred embodiment accomplishes the below conflict detection necessity determination in addition to the conflict detection necessity determination accomplished by the detection necessity determiner 70 according to the fifth preferred embodiment. The detection necessity determiner 70 determines, for each aircraft, whether or not conflict detection is necessary between that aircraft and one other aircraft, based on flight information received from the flight information acquirer 10. The detection necessity determiner 70 determines, for each partial route of that aircraft, whether or not conflict detection is necessary between the partial route of that aircraft and the partial route of the one other aircraft based on the target route information. If conflict detection is unnecessary in all combinations of partial routes of all partial routes of that aircraft and all partial routes of one other aircraft, the detection necessity determiner 70 determines that conflict detection is unnecessary between that aircraft and that one other aircraft. If conflict detection is necessary in at least one combination of partial routes, the detection necessity determiner 70 determines that conflict detection is necessary between that aircraft and that one other aircraft.

The detection necessity determiner 70 according to the sixth preferred embodiment generates the below information in addition to the target route information generated by the detection necessity determiner 70 according to the fifth preferred embodiment. The detection necessity determiner 70 accomplishes the above-described detection necessity determination for all aircraft and generates target aircraft information containing information identifying aircraft and one or two or more aircraft for which conflict detection is necessary for each aircraft. The detection necessity determiner 70 sends the generated target aircraft information and target route information to the approach detector 20.

Conflict detection accomplished by the approach detector 20 differing from the first preferred embodiment is explained below. The approach detector 20 selects one partial route of the target craft at one altitude and one partial route of one other aircraft flying at a set altitude, from the flight information. The approach detector 20 determines whether or not conflict detection is necessary between the target craft and the one other aircraft based on the target aircraft information. The approach detector 20 determines whether or not conflict detection is necessary between one partial route of the target craft and partial routes of the one other aircraft only when conflict detection is necessary between the target craft and the one other aircraft.

The approach detector 20 accomplishes conflict detection between the target craft and the one other aircraft for the selected partial route of the target craft and partial route of the one other craft the same as in the first preferred embodiment only when conflict detection is necessary between the one partial route of the target craft and the partial route of the one other aircraft.

Similar to the first preferred embodiment, the approach detector 20 repeats conflict detection and accomplishes conflict detection between the target craft and all other aircraft for all partial routes of the target craft at all altitudes, and generates conflict range information.

The action of control assistance according to the sixth preferred embodiment is the same as FIG. 23. Step S110 and from step S130 on in FIG. 23 are the same as the actions of the first preferred embodiment shown in FIG. 8. Details of the process of step S112 of FIG. 23 are different from the fifth preferred embodiment, so these are explained below.

The detection necessity determiner 70 accomplishes detection necessity determinations for each partial route and generates target route information, the same as in the fifth preferred embodiment. Furthermore, the above-described detection necessity determination is made and target aircraft information generated for each aircraft. The detection necessity determiner 70 sends the generated target route information and target aircraft information to the approach detector 20 (step S112).

Figure 25:
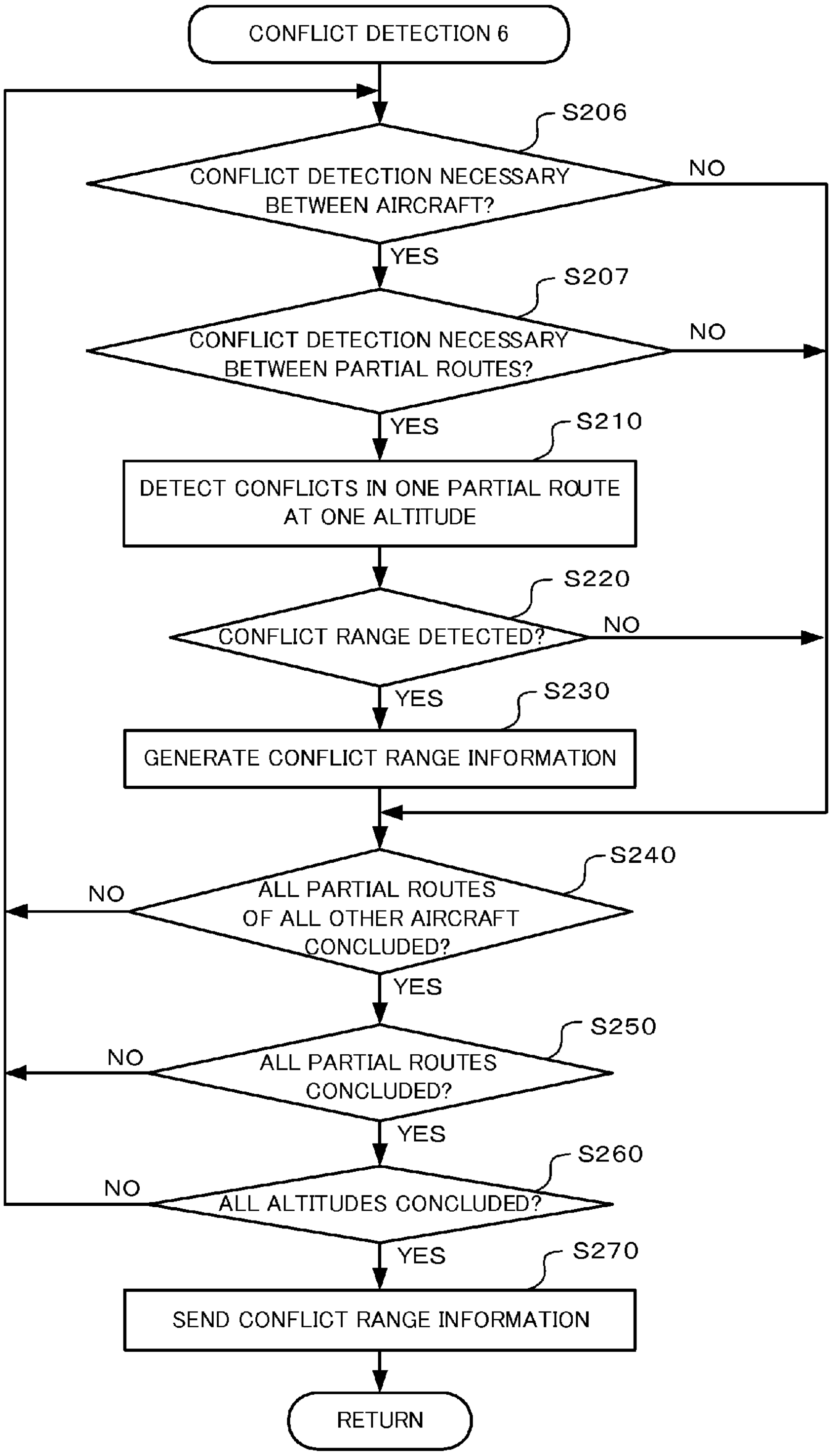
FIG. 25 flowchart showing an example of the action of conflict detection according to a sixth preferred embodiment of the present invention.

FIG. 25 is a flowchart showing an example of the action of conflict detection according to the sixth preferred embodiment of the present invention. This is detail of step S120 of FIG. 23. The approach detector 20 selects one partial route of the target craft at one altitude and one partial route of one other aircraft flying at a set altitude, from the flight information. The approach detector 20 determines whether or not conflict detection is necessary between the target craft and the one other aircraft based on the target aircraft information. When approach detection is necessary between the target craft and the one other aircraft (step S206: Yes), the approach detector 20 further determines whether or not conflict detection is necessary between the partial route of the target craft and the partial route of the one other aircraft, based on the target route information. When conflict detection is necessary between the partial route of the target craft and the partial route of the one other aircraft (step S207: Yes), the approach detector 20 accomplishes conflict detection between the target craft and the one other aircraft for the selected partial route of the target craft and partial route of the one other aircraft, the same as in the first preferred embodiment (step S210).

When conflict detection between the target craft and the one other aircraft is not necessary (step S206: No), or when conflict detection between the partial route of the target craft and the partial route of the one other aircraft is not necessary (step S206: Yes; S207: No), the approach detector 20 does not accomplish conflict detection between the target craft and the one other aircraft. The process from step S210 on is the same as the actions of the first preferred embodiment shown in FIG. 9.

As explained above, with the control assistance device 1 according to the sixth preferred embodiment, route changes midway through a partial route are possible in order to prevent the occurrence of conflicts with consideration for the controlled airspace as a whole.

Furthermore, the control assistance device 1 compares partial routes to each other in advance, and determines whether or not conflict detection is necessary between the partial routes. In addition, the control assistance device 1 compares partial routes on which the aircraft fly to each other in advance, and determines whether or not conflict detection is necessary between the aircraft. Conflict detection between the target craft and each other aircraft is accomplished only when conflict detection is necessary between the target craft and each other aircraft, and when conflict detection is necessary between the partial route on which the target craft is flying and the partial route on which the each other aircraft is flying. Consequently, the calculation burden of the conflict detection process is reduced, more efficient route search is accomplished and it is possible to more swiftly provide control guidance to prevent the occurrence of conflicts.

The preferred embodiments of the present invention are not limited to the above-described preferred embodiments, for multiple aspects of the above-described preferred embodiments may be arbitrarily combined.

In the above-described preferred embodiments, the approach detector 20 accomplished conflict detection at all altitudes, but it would be fine for the approach detector 20 to be comprised so as to accomplish conflict detection at altitudes within a prescribed range, for example, and not at all altitudes. Furthermore, the second position detector 40 may be comprised so as to accomplish altitude change range detection at altitudes excluding the set altitude of the target craft within the altitudes targeted by the approach detector 20.

Figure 26:
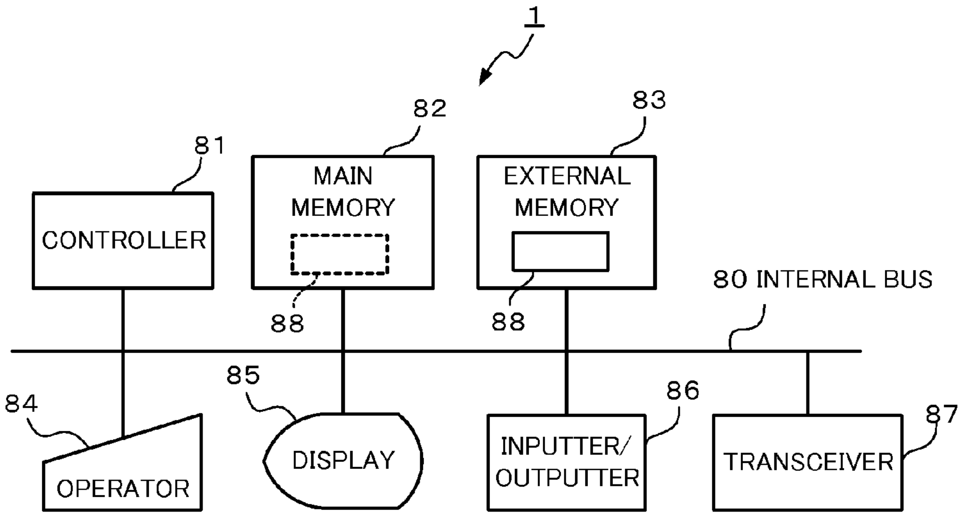
FIG. 26 is a block diagram showing an example of the physical composition of a control assistance device according to the preferred embodiments of the present invention.

FIG. 26 is a block diagram showing an example of the physical composition of the control assistance device 1 according to the preferred embodiments of the present invention.

The control assistance device 1 comprises a controller 81, a main memory 82, an external memory 83, an operator 84, a display 85, an inputter/outputter 86 and a transceiver 87. The main memory 82, external memory 83, operator 84, display 85, inputter/outputter 86 and transceiver 87 are all connected to the controller 81 via an internal bus 80.

The controller 81 is composed of a CPU (Central Processing Unit) and/or the like, and executes processes for providing control assistance in accordance with a control program 88 stored in the external memory 83.

The main memory 82 is composed of RAM (Random-Access memory) and/or the like, loads the control program 88 stored in the external memory 83 and is used as a work area by the controller 81.

The external memory 83 is composed of non-volatile memory such as flash memory, a hard disk, DVD-RAM (Digital Versatile Disc Random-Access Memory), DVD-RW (Digital Versatile Disc ReWritable) and/or the like, stores in advance the control program 88 for causing the controller 81 to execute the above-described processes, and in addition supplies data this control program stores to the controller 81 and stores data supplied from the controller 81, in accordance with instructions from the controller 81.

The operator 84 is composed of a keyboard and a pointing device such as a mouse or touch panel, and/or the like, and an interface device connecting the keyboard and the pointing device and/or the like to the internal bus 80. Through the operator 84, flight information is input and route search requests are received.

The display 85 is composed of a CRT (Cathode Ray Tube), an LCD (Liquid Crystal Display) or an organic EL (Electro-Luminescence) display and speakers and/or the like, and for example outputs altitude change range information.

The inputter/outputter 86 is composed of a serial interface or a parallel interface.

The transceiver 87 is composed of a wireless transceiver, a wireless modem or a network terminal device, and a serial interface or LAN (Local Area Network) interface connecting such. Flight information, altitude change range information and/or the like are sent and received via the transceiver 87.

The processes of the flight information acquirer 10, the approach detector 20, the first position detector 20, the second position detector 40, the altitude change detector 50, the common route detector 60 and the detection necessity determiner 70 of the control assistance device 1 shown in FIGS. 1, 17 and 22 are executed by the control program 88 processing using as resources the controller 81, the main memory 82, the external memory 83, the operator 84, the display 85, the inputter/outputter 86 and the transceiver 87.

Besides this, the above-described hardware composition and flowcharts are examples, and arbitrary alterations and revisions are possible.

The core parts for accomplishing the control process composed of the controller 81, the main memory 82, the external memory 83 and the internal bus 80 can be realized using a regular computer system, without needing a special system. For example, a computer program for executing the above-described actions may be stored and distributed on a computer-readable recording medium (flexible disk, CD-ROM, DVD-ROM and/or the like), and the control assistance device 1 for executing the above-described processes may be comprised by installing the above-described computer program on a computer. In addition, the above-described computer program may be stored in a memory device possessed by a server device on a communication network such as the Internet and/or the like, and the control assistance device 1 may be comprised by a regular computer system downloading such.

In addition, when the functions of the control assistance device 1 are partitioned between an OS (operating system) and application programs and are realized through cooperation between the OS and application programs, the application program part alone may be stored on a memory medium or memory device.

In addition, the computer program can be overlaid on carrier waves and distributed via a communication network. For example, the above-described computer program may be posted on a BBS (Bulletin Board System) on a communication network, and the above-described computer program may be distributed via the network. Moreover, the composition may be such that the above-described processes can be executed by activating this computer program and executing this the same as other application programs under control of the OS.

All or portions of the above-described preferred embodiments may be mentioned in the below appendices but are not limited thereto.

(Appendix 1)

A control assistance device comprising:

a flight information acquirer for acquiring flight information containing information indicating flight plans and positions of flight routes of each craft that is a target of control, in a controlled airspace;

a conflict detector for detecting, for a set altitude that is an altitude set in the flight information of a flight search target craft that is a one of the craft that is the target of control and is a target of route searching and at least one navigable altitude within the controlled airspace other than the set altitude, ranges in which a conflict occurs between the route search target craft and each of the other control-target craft and generating conflict range information indicating the ranges in which the conflicts occur at each altitude, when the route search target craft has flown on the flight path set in the flight plan maintaining the respective altitudes, based on the flight information;

a first position detector for detecting a first position that is a position farthest from the entry position into the controlled airspace navigable until occurrence of the conflict and generating first position information indicating the first position, when the route search target craft has flown on the flight path maintaining the set altitude, based on the flight information and the conflict range information;

a second position detector for detecting a second position that is a position closest to the entry position where separation is possible from the controlled airspace without occurrence of the conflict after the position at which a change was made from the set altitude to the navigable altitude, and generating second position information indicating the second position for each of the navigable altitudes, when the route search target craft has flown the flight path while maintaining the respective altitudes for each of the navigable altitudes that are targets of the conflict detection other than the set altitude, based on the flight information and the conflict range information; and an altitude change range detector for generating altitude change range information that makes the second position the start position and the first position the end position when the second position at the navigable altitude is closer to the entry position than the first position, for each navigable altitude that is the target of second position detection, based on the conflict information, the first position information and the second position information, and generating altitude change range information for each navigable altitude when the conflict range exists in the altitude change range at altitudes between the set altitude and the navigable altitudes, excluding the conflict range from the altitude change range.

(Appendix 2)

The control assistance device according to Appendix 1, wherein the conflict detector detects ranges in which the conflicts occur between the route search target craft and each other control-target craft and generates the conflict range information only when the altitude of the route search target craft is the same as the set altitude of each other control-target craft.

(Appendix 3)

The control assistance device according to Appendix 1 or Appendix 2, wherein the conflict detector detects ranges in which the conflicts occur between the route search target craft and each other control-target craft and generates the conflict range information only when the flight time of the route search target craft and the flight times of each of the other control-target craft overlap, on each partial route comprising the flight path on which the route search target craft is flying.

(Appendix 4)

The control assistance device according to any of Appendices 1 through 3, further comprising a common partial route detector for detecting common partial routes partial routes that are common among partial routes comprising the flight path on which the control-target craft is flying and partial routes comprising the flight paths on which each of the other control-target crafts are flying, for each control target craft, based on the flight information;

wherein the conflict detector, for each navigable altitude within the controlled airspace, detects the ranges in which the conflicts occur between the route search target craft and each of the other control-target craft and generates the conflict range information using relative speeds based on the speed of the route search target craft and the speeds of each of the other control-target crafts and the distances between the route search target craft and each of the other control-target crafts at the time when either the route search target craft or each of the other control-target crafts transits the start position of the partial route, when the altitude is the same as the set altitude of each of the other control-target crafts for each partial route comprising the flight path on which the route search target craft is flying, and the partial route and partial routes comprising the flight paths on which each of the other control-target crafts are flying are contained in the common partial route and the partial route and partial routes on which each of the other control-target crafts are flying are the same, or the partial route and partial routes on which each of the other control-target crafts are flying are part of a series of common partial routes composed from two or more consecutive common partial routes.

(Appendix 5)

The control assistance device according to any of Appendices 1 through 4, further comprising a conflict detection necessity determiner for determining the necessity of detecting ranges in which the conflicts occur in the conflict detector, based on the flight information;

wherein the conflict detector detects the ranges in which the conflicts occur between the route search target craft and each of the other control-target crafts and generates conflict range information only when the conflict detection necessity determiner has determined that detection of ranges where the conflicts occur is necessary, on partial routes comprising the flight path on which the route search target craft is flying, at each navigable altitude within the controlled airspace.

(Appendix 6)

The control assistance device according to Appendix 5, wherein:

the conflict detection necessity determiner determines the necessity of detecting ranges where the conflicts occur between a partial route and each other partial route, for each partial route contained in the flight plan; and the conflict detector detects ranges where the conflicts occur between the route search target craft and each of the other control-target crafts and generates conflict range information only when the conflict detection necessity determiner has determined that it is necessary to detect ranges where the conflicts occur between the partial route and the partial routes comprising the flight paths on which each of the other control-target crafts are flying, for each partial route comprising the flight path on which the route search target craft is flying, at each navigable altitude within the controlled airspace.

(Appendix 7)

The control assistance device according to Appendix 5 or Appendix 6, wherein:

the conflict detection necessity determiner determines the necessity of detecting ranges where the conflicts occur between the control-target craft and each of the other control-target crafts based on partial routes comprising the flight path on which the control-target craft is flying and partial routes comprising the flight paths on which each of the other control-target crafts is flying, for each control-target craft; and the conflict detector detects ranges where the conflicts occur between the route search target craft and each of the other control-target crafts and generates conflict range information only when the conflict detection necessity determiner has determined that it is necessary to detect ranges where the conflicts occur between the route search target craft and each of the other control-target crafts, for each partial route comprising the flight path on which the route search target craft is flying, at each navigable altitude within the controlled airspace.

(Appendix 8)

A control assistance method comprising:

a flight information acquisition step for acquiring flight information containing information indicating flight plans and positions of flight routes of each craft that is a target of control, in a controlled airspace;

a conflict detection step for detecting, for a set altitude that is an altitude set in the flight information of a flight search target craft that is a one of the craft that is the target of control and is a target of route searching and at least one navigable altitude within the controlled airspace other than the set altitude, ranges in which a conflict occurs between the route search target craft and each of the other control-target craft and generating conflict range information indicating the ranges in which the conflicts occur at each altitude, when the route search target craft has flown on the flight path set in the flight plan maintaining the respective altitudes, based on the flight information;

a first position detection step for detecting a first position that is a position farthest from the entry position into the controlled airspace navigable until occurrence of the conflict and generating first position information indicating the first position, when the route search target craft has flown on the flight path maintaining the set altitude, based on the flight information and the conflict range information;

a second position detection step for detecting a second position that is a position closest to the entry position where separation is possible from the controlled airspace without occurrence of the conflict after the position at which a change was made from the set altitude to the navigable altitude, and generating second position information indicating the second position for each of the navigable altitudes, when the route search target craft has flown the flight path while maintaining the respective altitudes for each of the navigable altitudes that are targets of the conflict detection other than the set altitude, based on the flight information and the conflict range information; and an altitude change range detection step for generating altitude change range information that makes the second position the start position and the first position the end position when the second position at the navigable altitude is closer to the entry position than the first position, for each navigable altitude that is the target of second position detection, based on the conflict information, the first position information and the second position information, and generating altitude change range information for each navigable altitude when the conflict range exists in the altitude change range at altitudes between the set altitude and the navigable altitudes, excluding the conflict range from the altitude change range.

(Appendix 9)

The control assistance method according to Appendix 8, wherein the conflict detection step detects ranges in which the conflicts occur between the route search target craft and each other control-target craft and generates the conflict range information only when the altitude of the route search target craft is the same as the set altitude of each other control-target craft.

(Appendix 10)

The control assistance method according to Appendix 8 or Appendix 9, wherein the conflict detection step detects ranges in which the conflicts occur between the route search target craft and each other control-target craft and generates the conflict range information only when the flight time of the route search target craft and the flight times of each of the other control-target craft overlap, on each partial route comprising the flight path on which the route search target craft is flying.

(Appendix 11)

The control assistance method according to any of Appendices 8 through 10, further comprising a common partial route detection step for detecting common partial routes partial routes that are common among partial routes comprising the flight path on which the control-target craft is flying and partial routes comprising the flight paths on which each of the other control-target crafts are flying, for each control target craft, based on the flight information;

wherein the conflict detection step, for each navigable altitude within the controlled airspace, detects the ranges in which the conflicts occur between the route search target craft and each of the other control-target craft and generates the conflict range information using relative speeds based on the speed of the route search target craft and the speeds of each of the other control-target crafts and the distances between the route search target craft and each of the other control-target crafts at the time when either the route search target craft or each of the other control-target crafts transits the start position of the partial route, when the altitude is the same as the set altitude of each of the other control-target crafts for each partial route comprising the flight path on which the route search target craft is flying, and the partial route and partial routes comprising the flight paths on which each of the other control-target crafts are flying are contained in the common partial route and the partial route and partial routes on which each of the other control-target crafts are flying are the same, or the partial route and partial routes on which each of the other control-target crafts are flying are part of a series of common partial routes composed from two or more consecutive common partial routes.

(Appendix 12)

The control assistance method according to any of Appendices 1 through 11, further comprising a conflict detection necessity determination step for determining the necessity of detecting ranges in which the conflicts occur in the conflict detection step, based on the flight information;

wherein the conflict detection step detects the ranges in which the conflicts occur between the route search target craft and each of the other control-target crafts and generates conflict range information only when the conflict detection necessity determination step has determined that detection of ranges where the conflicts occur is necessary, on partial routes comprising the flight path on which the route search target craft is flying, at each navigable altitude within the controlled airspace.

(Appendix 13)

The control assistance method according to Appendix 12, wherein:

the conflict detection necessity determination step determines the necessity of detecting ranges where the conflicts occur between a partial route and each other partial route, for each partial route contained in the flight plan; and the conflict detection step detects ranges where the conflicts occur between the route search target craft and each of the other control-target crafts and generates conflict range information only when the conflict detection necessity determination step has determined that it is necessary to detect ranges where the conflicts occur between the partial route and the partial routes comprising the flight paths on which each of the other control-target crafts are flying, for each partial route comprising the flight path on which the route search target craft is flying, at each navigable altitude within the controlled airspace.

(Appendix 14)

The control assistance method according to Appendix 12 or Appendix 13, wherein:

the conflict detection necessity determination step determines the necessity of detecting ranges where the conflicts occur between the control-target craft and each of the other control-target crafts based on partial routes comprising the flight path on which the control-target craft is flying and partial routes comprising the flight paths on which each of the other control-target crafts is flying, for each control-target craft; and the conflict detection step detects ranges where the conflicts occur between the route search target craft and each of the other control-target crafts and generates conflict range information only when the conflict detection necessity determination step has determined that it is necessary to detect ranges where the conflicts occur between the route search target craft and each of the other control-target crafts, for each partial route comprising the flight path on which the route search target craft is flying, at each navigable altitude within the controlled airspace.

(Appendix 15)

A computer-readable memory medium on which is recorded a program for causing a computer to execute:

a flight information acquisition step for acquiring flight information containing information indicating flight plans and positions of flight routes of each craft that is a target of control, in a controlled airspace;

a conflict detection step for detecting, for a set altitude that is an altitude set in the flight information of a flight search target craft that is a one of the craft that is the target of control and is a target of route searching and at least one navigable altitude within the controlled airspace other than the set altitude, ranges in which a conflict occurs between the route search target craft and each of the other control-target craft and generating conflict range information indicating the ranges in which the conflicts occur at each altitude, when the route search target craft has flown on the flight path set in the flight plan maintaining the respective altitudes, based on the flight information;

a first position detection step for detecting a first position that is a position farthest from the entry position into the controlled airspace navigable until occurrence of the conflict and generating first position information indicating the first position, when the route search target craft has flown on the flight path maintaining the set altitude, based on the flight information and the conflict range information;

a second position detection step for detecting a second position that is a position closest to the entry position where separation is possible from the controlled airspace without occurrence of the conflict after the position at which a change was made from the set altitude to the navigable altitude, and generating second position information indicating the second position for each of the navigable altitudes, when the route search target craft has flown the flight path while maintaining the respective altitudes for each of the navigable altitudes that are targets of the conflict detection other than the set altitude, based on the flight information and the conflict range information; and an altitude change range detection step for generating altitude change range information that makes the second position the start position and the first position the end position when the second position at the navigable altitude is closer to the entry position than the first position, for each navigable altitude that is the target of second position detection, based on the conflict information, the first position information and the second position information, and generating altitude change range information for each navigable altitude when the conflict range exists in the altitude change range at altitudes between the set altitude and the navigable altitudes, excluding the conflict range from the altitude change range.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Application 2010-266949, filed 30 Nov. 2010, and Japanese Patent Application 2011-155242, filed 13 Jul. 2011, the entire disclosures of which are incorporated by reference herein

INDUSTRIAL APPLICABILITY

The present invention can be used in a control assistance device for assisting in control guidance of air traffic controllers engaging in airspace control.

DESCRIPTION OF REFERENCE NUMERALS

1 Control assistance device
10 Flight information acquirer
20 Approach detector
30 First position detector
40 Second position detector
50 Altitude change detector
60 Common route detector
70 Detection necessity determiner
80 Internal bus
81 Controller
82 Main memory
83 External memory
84 Operator
85 Display
86 Inputter/Outputter
87 Transceiver
88 Control program
201 Approach range detector
202 Altitude comparator
203 Flight time comparator
204 Simple approach detector

What is claimed is:

1. A control assistance device comprising:

a flight information acquirer for acquiring flight information containing information indicating flight plans and positions of flight routes of each craft that is a target of control, in a controlled airspace;

a conflict detector for detecting, for a set altitude that is an altitude set in the flight information of a flight search target craft that is a one of the craft that is the target of control and is a target of route searching and at least one navigable altitude within the controlled airspace other than the set altitude, ranges in which a conflict occurs between the route search target craft and each of the other control-target craft and generating conflict range information indicating the ranges in which the conflicts occur at each altitude, when the route search target craft has flown on the flight path set in the flight plan maintaining the respective altitudes, based on the flight information;

a first position detector for detecting a first position that is a position farthest from the entry position into the controlled airspace navigable until occurrence of the conflict and generating first position information indicating the first position, when the route search target craft has flown on the flight path maintaining the set altitude, based on the flight information and the conflict range information;

a second position detector for detecting a second position that is a position closest to the entry position where separation is possible from the controlled airspace without occurrence of the conflict after the position at which a change was made from the set altitude to the navigable altitude, and generating second position information indicating the second position for each of the navigable altitudes, when the route search target craft has flown the flight path while maintaining the respective altitudes for each of the navigable altitudes that are targets of the conflict detection other than the set altitude, based on the flight information and the conflict range information; and an altitude change range detector for generating altitude change range information that makes the second position the start position and the first position the end position when the second position at the navigable altitude is closer to the entry position than the first position, for each navigable altitude that is the target of second position detection, based on the conflict information, the first position information and the second position information, and generating altitude change range information for each navigable altitude when the conflict range exists in the altitude change range at altitudes between the set altitude and the navigable altitudes, excluding the conflict range from the altitude change range.

2. The control assistance device according to claim 1, wherein the conflict detector detects ranges in which the conflicts occur between the route search target craft and each other control-target craft and generates the conflict range information only when the altitude of the route search target craft is the same as the set altitude of each other control-target craft.

3. The control assistance device according to claim 1, wherein the conflict detector detects ranges in which the conflicts occur between the route search target craft and each other control-target craft and generates the conflict range information only when the flight time of the route search target craft and the flight times of each of the other control-target craft overlap, on each partial route comprising the flight path on which the route search target craft is flying.

4. The control assistance device according to claim 1, further comprising a common partial route detector for detecting common partial routes partial routes that are common among partial routes comprising the flight path on which the control-target craft is flying and partial routes comprising the flight paths on which each of the other control-target crafts are flying, for each control target craft, based on the flight information;

wherein the conflict detector, for each navigable altitude within the controlled airspace, detects the ranges in which the conflicts occur between the route search target craft and each of the other control-target craft and generates the conflict range information using relative speeds based on the speed of the route search target craft and the speeds of each of the other control-target crafts and the distances between the route search target craft and each of the other control-target crafts at the time when either the route search target craft or each of the other control-target crafts transits the start position of the partial route, when the altitude is the same as the set altitude of each of the other control-target crafts for each partial route comprising the flight path on which the route search target craft is flying, and the partial route and partial routes comprising the flight paths on which each of the other control-target crafts are flying are contained in the common partial route and the partial route and partial routes on which each of the other control-target crafts are flying are the same, or the partial route and partial routes on which each of the other control-target crafts are flying are part of a series of common partial routes composed from two or more consecutive common partial routes.

5. The control assistance device according to claims 1, further comprising a conflict detection necessity determiner for determining the necessity of detecting ranges in which the conflicts occur in the conflict detector, based on the flight information;

wherein the conflict detector detects the ranges in which the conflicts occur between the route search target craft and each of the other control-target crafts and generates conflict range information only when the conflict detection necessity determiner has determined that detection of ranges where the conflicts occur is necessary, on partial routes comprising the flight path on which the route search target craft is flying, at each navigable altitude within the controlled airspace.

6. The control assistance device according to claim 5, wherein:

the conflict detection necessity determiner determines the necessity of detecting ranges where the conflicts occur between a partial route and each other partial route, for each partial route contained in the flight plan; and the conflict detector detects ranges where the conflicts occur between the route search target craft and each of the other control-target crafts and generates conflict range information only when the conflict detection necessity determiner has determined that it is necessary to detect ranges where the conflicts occur between the partial route and the partial routes comprising the flight paths on which each of the other control-target crafts are flying, for each partial route comprising the flight path on which the route search target craft is flying, at each navigable altitude within the controlled airspace.

7. The control assistance device according to claim 5 wherein:

the conflict detection necessity determiner determines the necessity of detecting ranges where the conflicts occur between the control-target craft and each of the other control-target crafts based on partial routes comprising the flight path on which the control-target craft is flying and partial routes comprising the flight paths on which each of the other control-target crafts is flying, for each control-target craft; and the conflict detector detects ranges where the conflicts occur between the route search target craft and each of the other control-target crafts and generates conflict range information only when the conflict detection necessity determiner has determined that it is necessary to detect ranges where the conflicts occur between the route search target craft and each of the other control-target crafts, for each partial route comprising the flight path on which the route search target craft is flying, at each navigable altitude within the controlled airspace.

8. A control assistance method comprising:

a flight information acquisition step for acquiring flight information containing information indicating flight plans and positions of flight routes of each craft that is a target of control, in a controlled airspace;

a conflict detection step for detecting, for a set altitude that is an altitude set in the flight information of a flight search target craft that is a one of the craft that is the target of control and is a target of route searching and at least one navigable altitude within the controlled airspace other than the set altitude, ranges in which a conflict occurs between the route search target craft and each of the other control-target craft and generating conflict range information indicating the ranges in which the conflicts occur at each altitude, when the route search target craft has flown on the flight path set in the flight plan maintaining the respective altitudes, based on the flight information;

a first position detection step for detecting a first position that is a position farthest from the entry position into the controlled airspace navigable until occurrence of the conflict and generating first position information indicating the first position, when the route search target craft has flown on the flight path maintaining the set altitude, based on the flight information and the conflict range information;

a second position detection step for detecting a second position that is a position closest to the entry position where separation is possible from the controlled airspace without occurrence of the conflict after the position at which a change was made from the set altitude to the navigable altitude, and generating second position information indicating the second position for each of the navigable altitudes, when the route search target craft has flown the flight path while maintaining the respective altitudes for each of the navigable altitudes that are targets of the conflict detection other than the set altitude, based on the flight information and the conflict range information; and an altitude change range detection step for generating altitude change range information that makes the second position the start position and the first position the end position when the second position at the navigable altitude is closer to the entry position than the first position, for each navigable altitude that is the target of second position detection, based on the conflict information, the first position information and the second position information, and generating altitude change range information for each navigable altitude when the conflict range exists in the altitude change range at altitudes between the set altitude and the navigable altitudes, excluding the conflict range from the altitude change range.

9. The control assistance method according to claim 8, wherein the conflict detection step detects ranges in which the conflicts occur between the route search target craft and each other control-target craft and generates the conflict range information only when the altitude of the route search target craft is the same as the set altitude of each other control-target craft.

10. The control assistance method according to claim 8, wherein the conflict detection step detects ranges in which the conflicts occur between the route search target craft and each other control-target craft and generates the conflict range information only when the flight time of the route search target craft and the flight times of each of the other control-target craft overlap, on each partial route comprising the flight path on which the route search target craft is flying.

11. The control assistance method according to claims 8, further comprising a common partial route detection step for detecting common partial routes partial routes that are common among partial routes comprising the flight path on which the control-target craft is flying and partial routes comprising the flight paths on which each of the other control-target crafts are flying, for each control target craft, based on the flight information;

wherein the conflict detection step, for each navigable altitude within the controlled airspace, detects the ranges in which the conflicts occur between the route search target craft and each of the other control-target craft and generates the conflict range information using relative speeds based on the speed of the route search target craft and the speeds of each of the other control-target crafts and the distances between the route search target craft and each of the other control-target crafts at the time when either the route search target craft or each of the other control-target crafts transits the start position of the partial route, when the altitude is the same as the set altitude of each of the other control-target crafts for each partial route comprising the flight path on which the route search target craft is flying, and the partial route and partial routes comprising the flight paths on which each of the other control-target crafts are flying are contained in the common partial route and the partial route and partial routes on which each of the other control-target crafts are flying are the same, or the partial route and partial routes on which each of the other control-target crafts are flying are part of a series of common partial routes composed from two or more consecutive common partial routes.

12. The control assistance method according to claims 8, further comprising a conflict detection necessity determination step for determining the necessity of detecting ranges in which the conflicts occur in the conflict detection step, based on the flight information;

wherein the conflict detection step detects the ranges in which the conflicts occur between the route search target craft and each of the other control-target crafts and generates conflict range information only when the conflict detection necessity determination step has determined that detection of ranges where the conflicts occur is necessary, on partial routes comprising the flight path on which the route search target craft is flying, at each navigable altitude within the controlled airspace.

13. The control assistance method according to claim 12, wherein:

the conflict detection necessity determination step determines the necessity of detecting ranges where the conflicts occur between a partial route and each other partial route, for each partial route contained in the flight plan; and the conflict detection step detects ranges where the conflicts occur between the route search target craft and each of the other control-target crafts and generates conflict range information only when the conflict detection necessity determination step has determined that it is necessary to detect ranges where the conflicts occur between the partial route and the partial routes comprising the flight paths on which each of the other control-target crafts are flying, for each partial route comprising the flight path on which the route search target craft is flying, at each navigable altitude within the controlled airspace.

14. The control assistance method according to claim 12, wherein:

the conflict detection necessity determination step determines the necessity of detecting ranges where the conflicts occur between the control-target craft and each of the other control-target crafts based on partial routes comprising the flight path on which the control-target craft is flying and partial routes comprising the flight paths on which each of the other control-target crafts is flying, for each control-target craft; and the conflict detection step detects ranges where the conflicts occur between the route search target craft and each of the other control-target crafts and generates conflict range information only when the conflict detection necessity determination step has determined that it is necessary to detect ranges where the conflicts occur between the route search target craft and each of the other control-target crafts, for each partial route comprising the flight path on which the route search target craft is flying, at each navigable altitude within the controlled airspace.

15. A computer-readable memory medium on which is recorded a program for causing a computer to execute:

a flight information acquisition step for acquiring flight information containing information indicating flight plans and positions of flight routes of each craft that is a target of control, in a controlled airspace;

a conflict detection step for detecting, for a set altitude that is an altitude set in the flight information of a flight search target craft that is a one of the craft that is the target of control and is a target of route searching and at least one navigable altitude within the controlled airspace other than the set altitude, ranges in which a conflict occurs between the route search target craft and each of the other control-target craft and generating conflict range information indicating the ranges in which the conflicts occur at each altitude, when the route search target craft has flown on the flight path set in the flight plan maintaining the respective altitudes, based on the flight information;

a first position detection step for detecting a first position that is a position farthest from the entry position into the controlled airspace navigable until occurrence of the conflict and generating first position information indicating the first position, when the route search target craft has flown on the flight path maintaining the set altitude, based on the flight information and the conflict range information;

a second position detection step for detecting a second position that is a position closest to the entry position where separation is possible from the controlled airspace without occurrence of the conflict after the position at which a change was made from the set altitude to the navigable altitude, and generating second position information indicating the second position for each of the navigable altitudes, when the route search target craft has flown the flight path while maintaining the respective altitudes for each of the navigable altitudes that are targets of the conflict detection other than the set altitude, based on the flight information and the conflict range information; and an altitude change range detection step for generating altitude change range information that makes the second position the start position and the first position the end position when the second position at the navigable altitude is closer to the entry position than the first position, for each navigable altitude that is the target of second position detection, based on the conflict information, the first position information and the second position information, and generating altitude change range information for each navigable altitude when the conflict range exists in the altitude change range at altitudes between the set altitude and the navigable altitudes, excluding the conflict range from the altitude change range.

* * * * *